(12) United States Patent
Rasmussen et al.

(10) Patent No.: US 7,683,100 B2
(45) Date of Patent: Mar. 23, 2010

(54) METHOD OF MAKING MACROPOROUS CATION EXCHANGE RESINS

(75) Inventors: Jerald K. Rasmussen, Stillwater, MN (US); Robert T. Fitzsimons, Jr., Minneapolis, MN (US); Kannan Seshadri, Woodbury, MN (US); Simon K. Shannon, Columbia Heights, MN (US); Peter D. Wickert, St. Paul, MN (US); James I. Hembre, Plymouth, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1107 days.

(21) Appl. No.: 11/313,529

(22) Filed: Dec. 21, 2005

(65) Prior Publication Data

US 2007/0142586 A1    Jun. 21, 2007

(51) Int. Cl.
*C08J 5/20*    (2006.01)
(52) U.S. Cl. .................. 521/31; 210/635; 428/304.4; 521/28; 526/303.1; 526/310; 526/319
(58) Field of Classification Search .............. 521/31, 521/28; 210/635; 428/304.4; 526/303.1, 526/310, 319
See application file for complete search history.

(56) References Cited

U.S. PATENT DOCUMENTS

| | | | |
|---|---|---|---|
| 2,527,300 A | 10/1950 | Dudley | |
| 3,058,594 A | 10/1962 | Hultgren | |
| 3,929,741 A | 12/1975 | Laskey | |
| 4,071,508 A | 1/1978 | Steckler | |
| 4,097,420 A | 6/1978 | Mikes et al. | |
| 4,134,815 A | 1/1979 | Jackson et al. | |
| 4,139,684 A | 2/1979 | Coupek et al. | |
| 4,153,661 A | 5/1979 | Ree et al. | |
| 4,157,418 A | 6/1979 | Heilmann | |
| 4,311,799 A | 1/1982 | Miyake et al. | |
| 4,446,261 A | 5/1984 | Yamasaki et al. | |
| 4,552,939 A | 11/1985 | Thaler et al. | |

(Continued)

FOREIGN PATENT DOCUMENTS

JP    05-247123    9/1993

(Continued)

OTHER PUBLICATIONS

Rasmussen et al., Mechanistic Studies on the Reverse Phase Suspension Copolymerization of Vinyldimethlazlactone and Methylenebisacr'ylamide', Makrornol. Chem., Macromol. Symp., No. 54/55, pp. 535-550 (i992).*

(Continued)

*Primary Examiner*—Peter D. Mulcahy
*Assistant Examiner*—Henry Hu
(74) *Attorney, Agent, or Firm*—Jean A. Lown

(57) ABSTRACT

Methods of making macroporous cation exchange resins are described. The macroporous cation exchange resins are in the form of particles such as beads that contain a hydrophilic, crosslinked, (meth)acrylic-type polymeric material. Additionally, methods of purifying a positively charged material using the macroporous cation exchange resins, methods of making chromatographic columns that contain the macroporous cation exchange resins, methods of making filter elements that contain the macroporous cation exchange resins, and methods of making porous composite materials that contain the macroporous cation exchange resins are described.

12 Claims, 1 Drawing Sheet

U.S. PATENT DOCUMENTS

| | | | |
|---|---|---|---|
| 4,565,663 A | 1/1986 | Errede et al. | |
| 4,810,381 A | 3/1989 | Hagen et al. | |
| 4,833,198 A | 5/1989 | Stanley, Jr. et al. | |
| 4,842,739 A | 6/1989 | Tang | |
| 4,957,943 A | 9/1990 | McAllister et al. | |
| 4,971,736 A | 11/1990 | Hagen et al. | |
| 5,037,858 A | 8/1991 | MacDonald | |
| 5,104,729 A | 4/1992 | Stedronsky | |
| 5,171,808 A | 12/1992 | Ryles et al. | |
| 5,264,125 A | 11/1993 | MacDonald et al. | |
| 5,403,902 A | 4/1995 | Heilmann et al. | |
| 5,468,847 A | 11/1995 | Heilmann et al. | |
| 5,561,097 A | 10/1996 | Gleason et al. | |
| 5,814,322 A | 9/1998 | Sebillotte-Arnaud | |
| 5,906,734 A * | 5/1999 | Girot et al. | 210/198.2 |
| 5,906,747 A * | 5/1999 | Coffman et al. | 210/635 |
| 5,993,935 A | 11/1999 | Rasmussen et al. | |
| 6,045,697 A * | 4/2000 | Girot et al. | 210/635 |
| 6,059,975 A | 5/2000 | Alexandratos et al. | |
| 6,323,249 B1 | 11/2001 | Dale et al. | |
| 6,423,666 B1 | 7/2002 | Liao et al. | |
| 6,590,094 B2 | 7/2003 | Karlou-Eyrisch et al. | |
| 6,756,462 B2 | 6/2004 | Pafford et al. | |
| 6,765,049 B2 | 7/2004 | Lorah et al. | |
| 6,897,347 B2 | 5/2005 | Purola | |
| 7,098,253 B2 | 8/2006 | Rasmussen | |
| 2002/0086908 A1 | 7/2002 | Chou et al. | |
| 2003/0018091 A1 | 1/2003 | Pafford et al. | |
| 2003/0078330 A1 | 4/2003 | Legrand et al. | |
| 2003/0088134 A1 | 5/2003 | Purola et al. | |
| 2003/0130462 A1 | 7/2003 | Ulbricht et al. | |
| 2005/0261384 A1 | 11/2005 | Rasmussen et al. | |
| 2005/0261385 A1 | 11/2005 | Rasmussen | |
| 2007/0142590 A1 | 6/2007 | Rasmussen et al. | |

FOREIGN PATENT DOCUMENTS

| | | |
|---|---|---|
| WO | WO 00/49031 | 8/2000 |
| WO | WO 02/087551 | 11/2002 |
| WO | WO-2008/014137 A1 * | 1/2008 |

OTHER PUBLICATIONS

Macintyre, Fiona S. and David C. Sherrington, "Control of Porous Morphology in Suspension Polymerized Poly(divinylbenzene) Resins Using Oligomeric Porogens," *Macromolecules* vol. 37, No. 20, Sep. 3, 2004, pp. 7628-7636.*

Xie, Shaofeng, Frantisek Svec, and Jean M.J. Frechet, "Preparation of Porous Hydrophilic Monoliths: Effect of the Polymerization Conditions on the Porous Properties of Poly(acrylamide-co-N-N'-methylenebisacrylamide) Monolithic Rods," *Polymer Science*, 1996, pp. 1013-1021.*

Drtina, et al., "Highly Cross-Linked Azlactone Functional Supports of Tailorable Polarity", *Macromolecules*, vol. 29, No. 13, pp. 4486-4489 (1996).

Rasmussen et al., "Mechanistic Studies on the Reverse Phase Suspension Copolymerization of Vinyldimethlazlactone and Methylenebisacrylamide", *Makromol. Chem., Macromol. Symp.*, No. 54/55, pp. 535-550 (1992).

Sherrington, "Preparation, structure and morphology of polymer supports", *Chem Commun.*, pp. 2275-2286 (1998).

Macintyre, Fiona S. and David C. Sherrington, "Control of Porous Morphology in Suspension Polymerized Poly(divinylbenzene) Resins Using Oligomeric Porogens," *Macromolecules* vol. 37, No. 20, Sep. 3, 2004, pp. 7628-7636.

Palm, Anders and Milos V. Novotny, "Macroporous Polyacrylamide/Poly(ethylene glycol) Matrixes as Stationary Phases in Capillary Electrochromatography," *Analytical Chemistry*, vol. 69, No. 22, Nov. 15, 1997, pp. 4499-4507.

Viklund, Camilla, Anders Nordstrom, Knut Irgum, Frantisek Svec, and Jean M. J. Frechet, "Preparation of Porous Poly(styrene-co-divinylbenzene) Monoliths with Controlled Pore Size Distributions Initiated by Stable Free Radicals and Their Pore Surface Functionalization by Grafting," *Macromolecules*, vol. 34, No. 13, May 17, 2001, pp. 4361-4369.

Xie, Shaofeng, Frantisek Svec, and Jean M.J. Frechet, "Preparation of Porous Hydrophilic Monoliths: Effect of the Polymerization Conditions on the Porous Properties of Poly(acrylamide-co-N-N'-methylenebisacrylamide) Monolithic Rods," *Polymer Science*, 1996, pp. 1013-1021.

Huval et al. European Polymer Journal, 40 (2004), 693-701.

* cited by examiner

METHOD OF MAKING MACROPOROUS CATION EXCHANGE RESINS

TECHNICAL FIELD

Methods of making and using a macroporous cation exchange resin are described.

BACKGROUND

Ion exchange resins are widely used within the biotechnology industry for the large-scale separation and/or purification of various biological molecules such as proteins, enzymes, vaccines, DNA, RNA, and the like. The vast majority of the cation exchange resins are based on either styrene/divinylbenzene copolymers or crosslinked agarose. The hydrophobic backbone of styrene/divinylbenzene copolymers can be prone to non-specific interactions with a number of materials leading to impure products. Although crosslinked agarose resins are generally less susceptible to non-specific interactions, these materials tend to be fairly soft gels and are usually unsuitable for purifications conducted within a chromatographic column using a high flow rate.

Some known cation exchange resins are based on (meth)acrylic-type polymeric materials. Many of these cation exchange resins, however, are gels or have a relatively low capacity or low porosity.

SUMMARY

Methods of making macroporous cation exchange resins, methods of purifying a positively charged material using the macroporous cation exchange resins, methods of making chromatographic columns that contain the macroporous cation exchange resins, methods of making filter elements that contain the macroporous cation exchange resins, and methods of making porous composite materials that contain the macroporous cation exchange resins are described.

In one aspect, a method of forming a macroporous cation exchange resin is described. The method includes preparing an aqueous phase composition that contains (a) a monomer mixture; (b) a water-soluble porogen of Formula I

$$R^1\text{---}(R^2\text{---}O)_n\text{---}R^3 \quad (I)$$

wherein $R^1$ is hydroxy, alkoxy, carboxy, acyloxy, or halo; each $R^2$ is independently an alkylene having 1 to 4 carbon atoms; $R^3$ is hydrogen, alkyl, carboxyalkyl, acyl, or haloalkyl; and n is an integer of 1 to 1,000; and (c) an aqueous phase solvent mixture that includes water and a mono-alcohol having 1 to 4 carbon atoms. The mono-alcohol is present in an amount of at least 20 weight percent based on the total weight of the aqueous phase solvent mixture. The monomer mixture includes (1) a crosslinking monomer containing N,N'-alkylenebis(meth)acrylamide, N,N'-heteroalkylenebis(meth)acrylamide, or a combination thereof; and (2) a negatively charged ionic monomer. All of the monomers in the monomer mixture have a lipophilicity index that is less than or equal to 20. The method of forming the macroporous cation exchange resin further includes suspending the aqueous phase composition in a non-polar organic solvent, polymerizing the monomer mixture to form particles of polymeric material, and removing the porogen from the particles.

In a second aspect, a method of separating or purifying a positively charged material is described. The method includes forming a macroporous cation exchange resin, contacting the macroporous cation exchange resin with positively charged material, and adsorbing at least a portion of the positively charged material on the macroporous cation exchange resin.

In a third aspect, a method of preparing a chromatographic column is described. The method includes forming a macroporous cation exchange resin and placing the macroporous cation exchange resin in a column.

In a fourth aspect, a method of preparing a filtration element is described. The method includes forming a macroporous cation exchange resin and disposing the macroporous cation exchange resin on a surface of a filtration medium.

In a fifth aspect, a method of making a porous composite material is described. The method includes forming a macroporous cation exchange resin and incorporating the macroporous cation exchange resin in a continuous, porous matrix.

The above summary of the present invention is not intended to describe each disclosed embodiment or every implementation of the present invention. The Figures, Detailed Description, and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
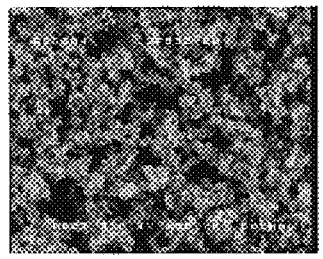
FIG. 1 shows a scanning electron micrograph of one exemplary macroporous cation exchange resin with a magnification of 50,000×. The macroporous cation exchange resin was prepared using a polyethylene glycol porogen having an average molecular weight of 200 grams/mole (g/mole).

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE INVENTION

Methods of making macroporous cation exchange resins are described. The macroporous cation exchange resins are in the form of particles such as beads that contain a hydrophilic, crosslinked, (meth)acrylic-type polymeric material. Additionally, methods of purifying a positively charged material using the macroporous cation exchange resins, methods of making chromatographic columns that contain the macroporous cation exchange resins, methods of making filter elements that contain the macroporous cation exchange resins, and methods of making porous composite materials that contain the macroporous cation exchange resins are described.

The terms "a", "an", and "the" are used interchangeably with "at least one" to mean one or more of the elements being described.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 10 carbon atoms, 1 to 8 carbon atoms, 1 to 6 carbon atoms, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene typically has 1 to 20 carbon atoms. In some embodiments, the alkylene contains 1 to 10, 1 to 8, 1 to 6, or 1 to 4 carbon atoms. The radical centers of the alkylene can be on the same carbon atom (i.e., an alkylidene) or on different carbon atoms.

The term "acyloxy" refers to a monovalent group of formula —O—(CO)—R where R is an alkyl and (CO) denotes that the carbon is attached to the oxygen with a double bond. An exemplary acyloxy group is acetoxy where R is methyl.

The term "acyl" refers to a monovalent group of formula —(CO)—R where R is an alkyl and the (CO) denotes that the carbon is attached to the oxygen with a double bond. An exemplary acyl group is acetyl where R is methyl.

The term "carboxy" refers to a monovalent group of formula —(CO)OH where (CO) denotes that the carbon is attached to the oxygen with a double bond.

The term "carboxyalkyl" refers to an alkyl substituted with a carboxy group.

The term "halo" refers to fluoro, chloro, bromo, or iodo.

The term "haloalkyl" refers to an alkyl substituted with a halo group.

The term "(meth)acrylic" refers to a polymeric material that is the reaction product of a monomer composition that includes acrylic acid, methacrylic acid, derivatives of acrylic acid or methacrylic acid, or combinations thereof. As used herein, the term "(meth)acrylate" refers to monomers that are acrylic acid, methacrylic acid, derivatives of acrylic acid or methacrylic acid, or combinations thereof. Suitable derivatives include esters, salts, amides, nitrites, and the like that can be unsubstituted or substituted. Some of these derivatives can include an ionic group.

The term "(meth)acryloyl" refers to a monovalent group of formula $H_2C=CR^b$—(CO)— where $R^b$ is hydrogen or methyl and (CO) denotes that the carbon is attached to the oxygen with a double bond.

The term "mono-alcohol" refers to an alcohol having a single hydroxy group. The alcohol is often of formula R—OH where R is an alkyl.

The terms "polymer" or "polymeric" refer to a material that is a homopolymer, copolymer, terpolymer, or the like. Likewise, the terms "polymerize" or "polymerization" refers to the process of making a homopolymer, copolymer, or the like.

The term "charged" refers to a material that has an ionic group as part of its chemical structure. A negatively charged material is an anion and a positively charged material is a cation. An oppositely charged counterion is typically associated with the ionic group. Adjusting the pH can alter the charge of some ionic groups.

The phrase "in the range of" includes the endpoints and all numbers between the endpoints. For example, the phrase in the range of 1 to 10 includes 1, 10, and all numbers between 1 and 10.

The term "water-soluble" used in reference to a porogen means that the porogen is miscible with the aqueous phase composition and does not partition out of an aqueous solution into a non-polar organic solvent to any appreciable extent. For example, less than 5 weight percent, less than 4 weight percent, less than 3 weight percent, less than 2 weight percent, or less than 1 weight percent of the porogen can be extracted from the aqueous solution into a non-polar organic solvent such as, for example, toluene and heptane.

The term "room temperature" refers to a temperature in the range of 20° C. to 25° C.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

The cation exchange resins are in the form of macroporous particles. As used herein, the term "macroporous" refers to particles that have a permanent porous structure even in the dry state. Although the resins can swell when contacted with a solvent, swelling is not needed to allow access to the interior of the particles through the porous structure. In contrast, gel-type resins do not have a permanent porous structure in the dry state but must be swollen by a suitable solvent to allow access to the interior of the particles. Macroporous particles are further described in Sherrington, *Chem. Commun.*, 2275-2286 (1998) and Macintyre et al., *Macromolecules*, 37, 7628-7636 (2004).

The method of making macroporous cation exchange resins involves the use of a porogen to vary or control the average pore size, the surface area, the cation exchange capacity, or a combination thereof. The average pore size, surface area, and cation exchange capacity are variables that can alter the effectiveness of a cation exchange resin for separating and/or purifying target molecules. Both the average pore size, which is characterized by the average pore diameter, and the surface area are measured by adsorption of nitrogen under cryogenic conditions. The cation exchange capacity refers to the amount of a positively charged material (i.e., target molecule) that can adsorb on the cation exchange resin. Exemplary target molecules include, but are not limited to, biological molecules such as proteins, enzymes, nucleic acids, and the like. The cation exchange capacity can be given, for example, in terms of the amount of a biomolecule such as a protein (e.g., lysozyme) that can be adsorbed per unit volume of resin swollen in a solvent or per unit weight of the dry resin.

The cation exchange capacity tends to increase when the pores are large enough to accommodate the molecules of interest (i.e., target molecules). The largest cation exchange capacity for biological molecules often can be achieved by providing a large fraction of the total surface area of the cation exchange resin in the form of pores that are sufficiently large to allow access of the target molecules by diffusion. A cation exchange resin designed for the separation and/or purification of relatively small proteins such as lysozyme or insulin, which typically have a respective average molecular weight of about 14,400 g/mole and 6,000 g/mole, can have a smaller average pore size than a cation exchange resin designed for the separation and/or purification of larger proteins such as an immunoglobulin (e.g., Immunoglobulin G (IgG)), which often has an average molecular weight of about 150,000 g/mole.

For the separation of many biological target molecules, the largest cation exchange capacity typically can be achieved when the cation exchange resin has a distribution of pore sizes. The diameters of the pores are typically in the range of about 5 nanometers to about 500 nanometers. For the separation and/or purification of many biological target molecules, it is often desirous that at least some of the pores of the cation exchange resin have a diameter less than or equal to 200 nanometers. The methods of preparing macroporous cation exchange resins described herein provide particles in which at least some of the pores have a diameter less than or equal to 200 nanometers (e.g., in the range of 2 to 200 nanometers), less than or equal to 150 nanometers (e.g., in the range of 2 to 150 nanometers), or less than or equal to 100 nanometers (e.g., in the range of 2 to 100 nanometers).

The method of preparing the macroporous cation exchange resin includes forming an aqueous phase composition that includes (a) a monomer mixture that contains a crosslinking monomer and a negatively charged ionic monomer; (b) a water-soluble porogen; and (c) an aqueous phase solvent mixture that contains water and a mono-alcohol. The method of preparing the macroporous cation exchange resin further includes suspending the aqueous phase composition in a non-polar organic solvent, polymerizing the monomer mixture to form particles of polymeric material, and removing the porogen from the cation exchange resin.

The cation exchange resins are the reaction products of a monomer mixture that contains a crosslinking monomer and a negatively charged ionic monomer. The crosslinking monomer includes N,N'-alkylenebis(meth)acrylamide, N,N'-heteroalkylenebis(meth)acrylamide, or a combination thereof. The negatively charged monomer has an ethylenically unsaturated group capable of undergoing a free radical polymerization reaction as well as a negatively charged group capable of interacting with a positively charged material.

All or substantially all of the monomers in the monomer mixture have a lipophilicity index less than or equal to 20. As used herein, the term "lipophilicity index" or "LI" refers to an index for characterizing the hydrophobic or hydrophilic character of a monomer. The lipophilicity index is determined by partitioning a monomer in equal volumes (1:1) of a non-polar solvent (e.g., hexane) and a polar solvent (e.g., a 75:25 acetonitrile-water solution). The lipophilicity index is equal to the weight percent of the monomer remaining in the non-polar phase after partitioning. Monomers that are more hydrophobic tend to have a higher lipophilicity index; similarly, monomers that are more hydrophilic tend to have a lower lipophilicity index. Measurement of lipophilicity index is further described in Drtina et al., *Macromolecules*, 29, 4486-4489 (1996).

As used herein with reference to the lipophilicity index of the monomer mixture being less than or equal to 20, the term "substantially all" means any monomer present with a lipophilicity index greater than 20 is present as an impurity. Any impurity with a lipophilicity index greater than 20 is present in an amount less than 2 weight percent, less than 1 weight percent, less than 0.5 weight percent, less than 0.2 weight percent, or less than 0.1 weight percent based on the total weight of the monomers in the monomer mixture. In some cation exchange resins, all or substantially all of the monomers in the monomer mixture have a lipophilicity index no greater than 15, no greater than 10, no greater than 5, no greater than 3, or no greater than 1.

Suitable crosslinking monomers include N,N'-alkylenebis (meth)acrylamide, N,N'-heteroalkylenebis(meth)acrylamide, or a combination thereof. These crosslinking monomers have at least two (meth)acryloyl groups that can react to crosslink one polymeric chain with another polymeric chain or that can react to crosslink one part of a polymeric chain with another part of the same polymeric chain. The crosslinking monomers are soluble in the aqueous phase composition and have a lipophilicity index less than or equal to 20.

Suitable N,N'-alkylenebis(meth)acrylamide crosslinking monomers include, but are not limited to, those having an alkylene group with 1 to 10, 1 to 8, 1 to 6, or 1 to 4 carbon atoms such as N,N'-methylenebisacrylamide, N,N'-methylenebismethacrylamide, N,N'-ethylenebisacrylamide, N,N'-ethylenebismethacrylamide, N,N'-propylenebisacrylamide, N,N'-propylenebismethacrylamide, N,N'-hexamethylenebisacrylamide, and N,N'-hexamethylenebismethacrylamide. Suitable N,N'-heteroalkylenebis(meth)acrylamide crosslinking monomers include, but are not limited to, N,N'-cystaminebisacrylamide, N,N'-piperazinebisacrylamide, and N,N'-piperazinebismethacrylamide. These crosslinking monomers are commercially available from various suppliers such as Sigma-Aldrich (Milwaukee, Wis.) and Polysciences, Inc. (Warrington, Pa.). Alternatively, these crosslinking monomers can be synthesized by procedures described in the art such as, for example, in Rasmussen, et al., *Reactive Polymers*, 16, 199-212 (1991/1992).

The monomer mixture includes greater than 10 weight percent crosslinking monomer based on the total weight of monomers in the monomer mixture. When lower amounts of the crosslinking monomer are used, the cation exchange resin tends to be in the form of a gel rather than in the form of macroporous particles. The rigidity or mechanical strength, which is measured by the differential pressure that the materials can withstand, tends to increase with the amount of crosslinking monomer included in the monomer mixture. Some monomer mixtures contain greater than 10 weight percent, at least 15 weight percent, at least 20 weight percent, at least 25 weight percent, or at least 30 weight percent crosslinking monomer.

The monomer mixture often contains up to 95 weight percent crosslinking monomer based on the total monomer weight. When the amount of the crosslinking monomer exceeds 95 weight percent, the cation exchange resin often has diminished cation exchange capacity because there is a corresponding decrease in the amount of the negatively charged ionic monomer present in the monomer mixture. Some monomer mixtures contain up to 90 weight percent, up to 85 weight percent, up to 80 weight percent, up to 70 weight percent, up to 65 weight percent, up to 60 weight percent, up to 55 weight percent, up to 50 weight percent, up to 45 weight percent, or up to 40 weight percent crosslinking monomer.

Some monomer mixtures contain greater than 10 to 95 weight percent, greater than 10 to 90 weight percent, 20 to 90 weight percent, 20 to 80 weight percent, 25 to 80 weight percent, 25 to 75 weight percent, 25 to 70 weight percent, 25 to 60 weight percent, or 25 to 50 weight percent crosslinking monomer based on the total monomer weight.

The monomer mixture also includes a negatively charged ionic monomer. The negatively charged ionic monomer has at least one ethylenically unsaturated group capable of undergoing free radical polymerization. In some embodiments, the ethylenically unsaturated group is a (meth)acryloyl group or a vinyl group. The negatively charged ionic monomer can be a weak acid, a strong acid, a salt of a weak acid, a salt of a strong acid, or combinations thereof. That is, the negatively charged ionic monomer can be in a neutral state but capable of being charged if the pH is adjusted. When the pH is suitably adjusted, the resulting cation exchange resins have negatively charged groups capable of interacting with positively charged materials (i.e., cations). If the ionic monomer used to prepare a cation exchange resin includes a salt of a weak acid or a salt of a strong acid, the counter ions of these salts can be, but are not limited to, alkali metals, alkaline earth metals, ammonium ions, or tetraalkylammonium ions.

Some exemplary ionic monomers having a negative charge include (meth)acrylamidosulfonic acids of Formula II or salts thereof.

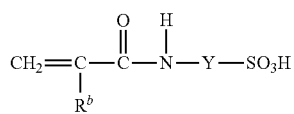

In Formula II, Y is a straight or branched alkylene having 1 to 10 carbon atoms and $R^b$ is hydrogen or methyl. Exemplary ionic monomers according to Formula II include, but are not limited to, N-acrylamidomethanesulfonic acid, 2-acrylamidoethanesulfonic acid, 2-acrylamido-2-methylpropanesulfonic acid, and 2-methacrylamido-2-methylpropanesulfonic acid. Salts of these acidic monomers can also be used.

Other suitable ionic monomers for preparing a cation exchange resin include sulfonic acids such as vinylsulfonic acid and 4-styrenesulfonic acid; (meth)acrylamidophosphonic acids such as (meth)acrylamidoalkylphosphonic acids (e.g., 2-acrylamidoethylphosphonic acid and 3-methacrylamidopropylphosphonic acid); acrylic acid and methacrylic acid; and carboxyalkyl(meth)acrylates such as 2-carboxyethylacrylate, 2-carboxyethylmethacrylate, 3-carboxypropylacrylate, and 3-carboxypropylmethacrylate. Still other suitable acidic monomers include (meth)acryloylamino acids, such as those described in U.S. Pat. No. 4,157,418 (Heilmann), incorporated herein by reference. Exemplary (meth) acryloylamino acids include, but are not limited to, N-acryloylglycine, N-acryloylaspartic acid, N-acryloyl-β-alanine, and 2-acrylamidoglycolic acid. Salts of any of these acidic monomers can also be used.

The monomer mixture includes at least 5 weight percent of the negatively charged monomer based on the total weight of monomers in the monomer mixture. When lower levels of the negatively charged monomer are used, the cation exchange resin often has diminished cation exchange capacity. Some monomer mixtures contain at least 10 weight percent, at least 15 weight percent, at least 20 weight percent, at least 25 weight percent, at least 30 weight percent, or at least 35 weight percent of the negatively charged monomer.

The monomer mixture often contains less than 90 weight percent of the negatively charged ionic monomer based on the total weight of the monomers. When higher levels of the negatively charged ionic monomer are used, the cation exchange resins tend to be gels rather than macroporous particles. That is, higher levels of negatively charged ionic monomers are often accompanied by a corresponding decrease in the amount of crosslinking monomer. The rigidity and mechanical strength of the cation exchange resin tends to correlate with the amount of crosslinking monomer. Some monomer mixtures contain less than 90 weight percent, no greater than 85 weight percent, no greater than 80 weight percent, no greater than 75 weight percent, no greater than 70 weight percent, no greater than 65 weight percent, no greater than 60 weight percent, no greater than 55 weight percent, no greater than 50 weight percent, no greater than 45 weight percent, or no greater than 40 weight percent of the negatively charged monomer.

Some monomer mixtures contain 5 to less than 90 weight percent, 10 to less than 90 weight percent, 20 to less than 90 weight percent, 30 to less than 90 weight percent, 30 to 80 weight percent, 40 to less than 90 weight percent, 40 to 80 weight percent, 50 to 80 weight percent, or 60 to 80 weight percent of the negatively charged monomer based on the total monomer weight. The amount of negatively charged monomer and crosslinking monomer can be balanced to provide a cation exchange resin with the desired combination of cation exchange capacity and mechanical strength.

For applications such as those that include the use of the macroporous ion exchange resins within a column, monomer mixtures containing 25 to 75 weight percent of the ionic monomer and 25 to 75 weight percent of the crosslinking monomer often provide the best balance of cation exchange capacity and mechanical strength. Some exemplary monomer mixtures include 35 to 75 weight percent of the negatively charged ionic monomer and 25 to 65 weight percent of the crosslinking monomer, 40 to 75 weight percent of the negatively charged ionic monomer and 25 to 60 weight percent of the crosslinking monomer, 50 to 75 weight percent of the negatively charged ionic monomer and 25 to 50 weight percent of the crosslinking monomer, or 60 to 70 percent of the negatively charged ionic monomer and 30 to 40 weight percent of the crosslinking monomer.

In some specific monomer mixtures, the crosslinking monomer is a N,N'-alkylenebis(meth)acrylamide and the negatively charged ionic monomer is of Formula II. The monomer mixture includes 25 to 75 weight percent of the negatively charged ionic monomer and 25 to 75 weight percent of the crosslinking monomer, 35 to 75 weight percent of the negatively charged ionic monomer and 25 to 65 weight percent of the crosslinking monomer, 40 to 75 weight percent of the negatively charged ionic monomer and 25 to 60 weight percent of the crosslinking monomer, 50 to 75 weight percent of the negatively charged ionic monomer and 25 to 50 weight percent of the crosslinking monomer, or 60 to 70 percent of the negatively charged ionic monomer and 30 to 40 weight percent of the crosslinking monomer. For example, the monomer mixture can contain 35 weight percent of the crosslinking monomer and 65 weight percent of the negatively charged ionic monomer.

Although some monomer mixtures are free of monomers other than the crosslinking monomer and the negatively charged ionic monomer, other monomer mixtures include a hydrophilic but non-ionic monomer having a single ethylenically unsaturated group. The hydrophilic, non-ionic monomer can be added, for example, for the purpose of adjusting the cation exchange capacity while maintaining the amount of crosslinking monomer constant. That is, the cation exchange capacity can be modified without significantly altering the amount of crosslinking, or the rigidity of the cation exchange resin. Additionally, the hydrophilic character of the cation exchange resins can be modified with the use of these non-ionic monomers.

Suitable hydrophilic, non-ionic monomers are typically present in amounts no greater than 50 weight percent based on the total weight of the monomers in the monomer mixture. In some cation exchange resins, the monomer mixture contains no greater than 40 weight percent, no greater than 20 weight percent, no greater than 10 weight percent, no greater than 5 weight percent, no greater than 2 weight percent, or no greater than 1 weight percent hydrophilic, non-ionic monomer based on the total weight of monomers.

Examples of non-ionic monomers that have a sufficiently low lipophilicity index include, but are not limited to, hydroxyalkyl(meth)acrylates such as 2-hydroxyethylacrylate, 3-hydroxypropylacrylate, 2-hydroxyethylmethacrylate (e.g., LI is 1), and 3-hydroxypropylmethacrylate (e.g., LI is 2); acrylamide (e.g., LI is less than 1) and methacrylamide (LI is less than 1); glycerol monomethacrylate and glycerol monoacrylate; N-alkyl(meth)acrylamides such as N-methylacrylamide (e.g., LI is less than 1), N,N-dimethylacrylamide (e.g., LI is less than 1), N-methylmethacrylamide, and N,N-dimethylmethacrylamide; N-vinylamides such as N-vinylformamide, N-vinylacetamide, and N-vinylpyrrolidone; acetoxyalky(meth)acrylates such as 2-acetoxyethylacrylate and 2-acetoxyethylmethacrylate (e.g., LI is 9); glycidyl (meth)acrylates such as glycidylacrylate and glycidylmethacrylate (e.g., LI is 11); and vinylalkylaziactones such as vinyldimethylazlactone (e.g., LI is 15).

The monomer mixture is generally substantially free of hydrophobic monomers. More specifically, the monomer mixture is substantially free of monomers having a lipophilicity index greater than 20. Cationic exchange resins that are substantially free of hydrophobic monomers tend to have low non-specific adsorption of impurities such as non-target materials such as non-target proteins, lipids and the like. Monomers that have a lipophilicity index greater than 20 and that are generally not in the monomer mixture include, for example, ethyleneglycoldimethacrylate (LI is 25), phenoxyethylmethacrylate (LI is 32), trimethylolpropanetrimethacrylate (LI is 37), methylmethacrylate (LI is 39), ethylmethacrylate (LI is 53), butylmethacrylate (LI is 73), cyclohexylmethacrylate (LI is 90), laurylmethacrylate (LI is 97), and the like.

The aqueous phase composition usually contains at least 4 weight percent monomer mixture based on the total weight of the aqueous phase composition (e.g., monomer mixture, porogen, and aqueous phase solvent mixture). In some embodiments, the aqueous phase composition can contain at least 10 weight percent or at least 15 weight percent monomer mixture. The aqueous phase composition usually contains up to 50 weight percent monomer mixture based on the total weight of the aqueous phase composition. In some embodiments, the aqueous phase composition can contain up to 40 weight percent, up to 30 weight percent, up to 25 weight percent, or up to 20 weight percent monomer mixture. For example, the aqueous phase composition can contain 5 to 30 weight percent, 5 to 25 weight percent, 5 to 20 weight percent, or 10 to 20 weight percent monomer mixture based on the total weight of the aqueous phase composition.

In addition to the monomer mixture, the aqueous phase composition includes a water-soluble porogen. The porogen facilitates the formation of a macroporous cation exchange resin that can be used for the purification and/or separation of biological molecules. The porogen is not a monomer and is free of groups such as ethylenically unsaturated groups that can undergo a free radical polymerization reaction with either the crosslinking monomer or the negatively charged ionic monomer. The porogen, in general, is not covalently attached to the polymeric material and is usually removed after the polymerization reaction is complete. During the polymerization reaction, however, the porogen may covalently bond to the polymeric material of the cation exchange resin through a chain transfer reaction. Preferably, the porogen is not bonded to the polymeric material of the cation exchange resin. The porogen is an alkylene oxide or polyalkylene oxide of Formula I $$R^1-(R^2-O)_n-R^3 \qquad (I)$$

wherein $R^1$ is hydroxy, alkoxy, carboxy, acyloxy, or halo; each $R^2$ is independently an alkylene having 1 to 4 carbon atoms; $R^3$ is hydrogen, alkyl, carboxyalkyl, acyl, or haloalkyl; and n is an integer of 1 to 1,000.

In some exemplary porogens, both end groups (i.e., group $-R^1$ and group $-OR^3$) are hydroxy groups (i.e., $R^1$ is hydroxy and $R^3$ is hydrogen). In other exemplary porogens, $R^1$ is hydroxy and $R^3$ is an alkyl (e.g., an alkyl having 1 to 20, 1 to 10, 1 to 6, or 1 to 4 carbon atoms), haloalkyl (e.g., chloroalkyl such as chloromethyl), acyl (e.g., acetyl), or carboxyalkyl (e.g., carboxymethyl). That is, one end group is hydroxy and the other end group is an alkoxy, haloalkoxy, acyloxy, or carboxy (e.g., carboxyalkoxy, which is an alkoxy substituted with a carboxy). In other exemplary porogens, $R^1$ is an alkoxy (e.g., an alkoxy having 1 to 10, 1 to 6, or 1 to 4 carbon atoms) and $R^3$ is an alkyl (e.g., an alkyl having 1 to 10, 1 to 6, or 1 to 4 carbon atoms) or an acyl (e.g., acetyl). That is, one end group is an alkoxy and the other end group is an alkoxy or acyloxy. In still other exemplary porogens, $R^1$ is carboxy and $R^3$ is carboxy alkyl (e.g., carboxymethyl). That is, both end groups are carboxy ($-OR^3$ is carboxyalkoxy).

Group $R^2$ in Formula I is an alkylene such as, for example, methylene, ethylene, or propylene. Suitable porogens with ethylene $R^2$ groups include ethylene glycol and ethylene glycol based materials such as diethylene glycol, triethylene glycol, and higher homologs. The higher homologs of ethylene glycol are often referred to as polyethylene glycol (i.e., PEG) or polyethylene oxide (i.e., PEO). Other suitable porogens with propylene $R^2$ groups include propylene glycol and propylene glycol based materials such as dipropylene glycol, tripropylene glycol, and higher homologs. The higher homologs of propylene glycol are often referred to as polypropylene glycol (i.e., PPG) or polypropylene oxide (i.e., PPO). The porogens can be random or block copolymers of polyethylene oxide and polypropylene oxide.

Subscript n in Formula I can be an integer greater than 1, greater than 2, greater than 5, greater than 10, greater than 20, greater than 50, greater than 100, greater than 200, or greater than 500. For example, n can be an integer in the range of 1 to 1,000, in the range of 1 to 800, in the range of 1 to 600, in the range of 1 to 500, in the range of 1 to 200, or in the range of 1 to 100.

Some porogens are polyalkylene oxides having a molecular weight of at least 200 g/mole, at least 400 g/mole, at least 800 g/mole, at least 1,000 g/mole, at least 2,000 g/mole, 4,000 g/mole, at least 8,000 g/mole, or at least 10,000 g/mole. The polyalkylene oxide porogens often have an average molecular weight up to 20,000 g/mole, up to 16,000 g/mole, up to 12,000 g/mole, up to 10,000 g/mole, up to 8,000 g/mole, up to 6,000 g/mole up to 4,000 g/mole, up to 2,000 g/mole, or up to 1,000 g/mole. For example, the polyalkylene oxide porogen typically has an average molecular weight in the range of 200 to 20,000 g/mole, in the range of 200 to 16,000 g/mole, in the range of 200 to 8,000 g/mole, in the range of 200 to 4,000 g/mole, in the range of 200 to 2,000 g/mole, or in the range of 200 to 1,000 g/mole.

In some methods of forming the cation exchange resin, a mixture of porogens can be used. For example, the porogen can be a mixture of a first porogen being alkylene glycol (i.e., n is equal to 1 in Formula I) and a second porogen that is a polyalkylene oxide (i.e., n is greater than 1 in Formula I). In a more specific example, the porogen can be a mixture of ethylene glycol with a polyethylene glycol with hydroxy end groups.

Polyalkylene oxides are commercially available that have end groups (i.e., groups $R^1$ and $-OR^3$) selected from hydroxy, methoxy, a combination of hydroxy and methoxy, a combination of hydroxy and chloro, a combination of alkoxy and acetoxy, or at least one carboxy group. Such materials can be obtained, for example, from Sigma-Aldrich (Milwaukee, Wis.), Nektar (Huntsville, Ala.), and Dow Chemical (Midland, Mich.).

The method of preparing the cation exchange resin is an inverse suspension polymerization process. The aqueous phase composition, which includes (a) the monomer mixture, (b) the porogen, and (c) the aqueous phase solvent mixture, is dispersed or suspended as droplets in a non-polar organic solvent with the volume of the non-polar organic solvent typically being greater than the volume of the aqueous phase composition. The porogen is usually a liquid that can function as a conventional solvent for the monomer mixture within the aqueous phase composition. Useful porogens generally do not partition between the aqueous phase composition and the non-polar organic solvent to any appreciable extent (i.e., the porogen is not extracted in any appreciable amount from the aqueous phase composition into the non-polar solvent). For example, less than 5 weight percent, less than 4 weight percent, less than 3 weight percent, less than 2 weight percent, or less than 1 weight percent of the porogen can be extracted from the aqueous phase composition into the non-polar organic solvent such as toluene, heptane, or the like.

As the free radical polymerization reaction proceeds, many polymeric molecules are formed within each aqueous phase droplet. The polymeric molecules continue to grow and crosslink as the reaction proceeds. When the molecular weight becomes sufficiently large, a polymeric phase separates from the aqueous phase composition within the droplet. Although not wanting to be bound by theory, it is believed that the pores are formed, at least in part, by the exclusion of the aqueous solvent from the polymeric material as the molecular weight increases. The point at which phase separation occurs can influence the average pore size and the pore size distribution. A later phase separation tends to favor the formation of cation exchange resin particles that have smaller pores and larger surface areas. Conversely, an earlier phase separation tends to favor the formation of cation exchange resin particles that have larger pores and smaller surface areas.

The point at which phase separation occurs can be influenced by the compatibility of the porogen with the forming polymeric material and the amount of porogen. Additionally, the point at which phase separation occurs can be influenced by the amount of crosslinking monomer present in the monomer mixture, with larger amounts of crosslinking monomer typically favoring earlier phase separation due to a more rapid increase in the molecular weight of the polymeric material.

Porogens that are compatible with the forming polymeric material (i.e., porogens that are good solvents for the forming polymeric material) tend to result in a later phase separation compared to porogens that are less compatible with the forming polymeric material (porogens that are poor solvents for the forming polymeric material). Porogens with a higher solubility for the forming polymeric material tend to result in the formation of cation exchange resin particles that have smaller pores and larger surface areas compared to porogens having a lower solubility for the forming polymeric material. Conversely, porogens with a lower solubility for the forming polymeric material tend to result in the formation of cation exchange particles that have larger pores and smaller surface areas compared to porogens having a greater solubility for the forming polymeric material.

The cation exchange resin can be designed for the target molecule of interest. That is, the cation exchange resin can be designed to optimize the cation exchange capacity for a particular target molecule. Cation exchange resins with larger pore sizes are often more suitable for larger target molecules. The molecular weight of the porogen, the end group of the porogen (i.e., groups $—R^1$ and $—OR^3$ in Formula I), the amount of the porogen, and the composition of the monomer mixture can affect the average pore size, the surface area, and pore volume.

The addition of porogen tends to increase the surface area, pore size, and the cation exchange capacity (i.e., capacity for a target molecule) until a maximum binding capacity is reached for the particular choice of porogen and monomer composition. Further addition of porogen can either result in no change in the cation exchange capacity or can result in a decreased cation exchange capacity. A decreased cation exchange capacity is typically accompanied by a decrease in the surface area and an increase in the average pore size. As used herein, the term "maximum binding capacity" refers to the maximum cation exchange capacity for a particular target molecule and for a particular combination of porogen and monomer composition.

With porogens having hydroxy end groups and having a lower average molecular weight (e.g., an average molecular weight of about 1,000 or less), increasing the amount of porogen in the aqueous phase composition beyond the amount needed for maximum binding capacity does not significantly alter the average pore size, the surface area, or the cation exchange capacity. That is, the average pore size, surface area, and cation exchange capacity usually can be maintained with the addition of larger amounts of porogen. Macroporous cation exchange resins can be prepared using, for example, up to 100 weight percent or more porogen based on the total weight of monomers in the monomer mixture. Exemplary cation exchange resins can be prepared using up to 80 weight percent, up to 60 weight percent, up to 40 weight percent, up to 20 weight percent, or up to 10 weight percent porogen based on the total weight of monomers in the monomer mixture.

With polyalkylene oxide porogens having hydroxy end groups and having a higher average molecular weight (e.g., an average molecular weight greater than about 1,000 g/mole), increasing the amount of porogen in the aqueous phase composition beyond the amount needed for maximum binding capacity tends to increase the average pore size, decrease the surface area, and decrease the cation exchange capacity. That is, the average pore size, the surface area, and the cation exchange capacity cannot be maintained with the addition of larger amounts of porogen. As the average molecular weight of the porogen increases above about 1,000 g/mole, the maximum amount of the porogen that can be used to produce a macroporous cation exchange resin having an acceptably large cation exchange capacity for biological molecules usually decreases. Depending on the molecular weight, the amount of porogen can be up to about 20 weight percent based on the total weight of monomers in the monomer mixture. Although macroporous resins can be prepared using larger amounts of the porogen, an acceptably large cation exchange capacity often cannot be obtained because the average pore size tends to be too large and the surface area tends to be too small. Exemplary cation exchange resins can be prepared using up to 10 weight percent, up to 5 weight percent, up to 2 weight percent, or up to 1 weight percent porogen based on the total weight of monomers in the monomer mixture. Although not wanting to be bound by theory, the decreased amount of porogen that can be used as the molecular weight increases may be attributable, at least in part, to the decreased compatibility of the higher molecular weight porogen with the forming polymeric material that leads to earlier phase separation.

Cation exchange resins of comparable cation exchange capacity can be obtained using porogens of different molecular weight. For example, cation exchange resins prepared using up to about 100 weight percent of a polyethylene glycol porogen having hydroxy end groups and an average molecular weight of 400 g/mole can have comparable porosity and cation exchange capacity to resins prepared using up to about 5 weight percent of a polyethylene glycol porogen having hydroxy end groups and an average molecular weight of 3,400 g/mole. The weight percent porogen is based on the total weight of monomers in the monomer mixture.

If a polyethylene oxide with hydroxy end groups and an average molecular weight of 400 g/mole is used as the porogen, the porogen concentration is typically in the range of 0.1 to 20 weight percent based on the total weight of the aqueous phase composition (e.g., the combined weight of the monomer mixture, porogen, and aqueous solvent mixture). For example, the amount of porogen can be in the range of 0.2 to 20 weight percent, 0.3 to 20 weight percent, 0.3 to 15 weight percent, 0.5 to 15 weight percent, 1 to 15 weight percent, or 2 to 15 weight percent based on the total weight of the aqueous phase composition.

If a polyethylene oxide with hydroxy end groups and an average molecular weight of 3,400 g/mole is used as the porogen, the porogen concentration is typically in the range of 0.05 to 3 weight percent based on the total weight of the aqueous phase composition (e.g., the combined weight of the monomer mixture, porogen, and aqueous solvent mixture). For example, the amount of porogen can be in the range of 0.1 to 3 weight percent, 0.1 to 2 weight percent, or 0.1 to 1 weight percent based on the total weight of the aqueous phase composition.

In some methods of forming the cation exchange resin, a mixture of porogens can be used. For example, the porogen can be a mixture of a first porogen having a lower molecular weight (e.g., less than an average molecular weight of about 1,000 g/mole, less than 500 g/mole, less than 200 g/mole, or less than 100 g/mole) with a second porogen having a higher molecular weight (e.g., greater than 1,000 g/mole, greater than 2,000 g/mole, greater than 3,000 g/mole, or greater than 4,000 g/mole). In a more specific example, the porogen can be a mixture of ethylene glycol with a polyethylene glycol. The amount of ethylene glycol can be in the range of 0.5 to 15 weight percent and the polyethylene glycol can be in the range of 0.05 to 5 weight percent based on the total weight of the aqueous phase composition. For example, the amount of ethylene glycol can be in the range of 1 to 7 weight percent and the amount of polyethylene glycol can be in the range of 1 to 3 weight percent.

Porogens with an alkoxy end group (i.e., the group $-R^1$ is alkoxy and the group $-R^3$ is alkoxy ($R^3$ is alkyl)) are typically used in a lower amount than porogens of comparable molecular weight in which both end groups are hydroxyl groups (i.e., $R^1$ is hydroxy and $R^3$ is hydrogen). Porogens with alkoxy end groups tend to be less soluble in the aqueous phase composition compared to porogens with hydroxy end groups. Porogens with alkoxy end groups tend to be less compatible with the forming polymeric material. Increasing the amount of porogen in the aqueous phase composition beyond the amount needed for maximum binding capacity tends to increase the average pore size, decrease the surface area, and decrease the cation exchange capacity. That is, the average pore size, the surface area, and the cation exchange capacity cannot be maintained with the addition of larger amounts of porogen. The amount of porogen can be up to about 20 weight percent, up to about 10 weight percent, up to about 5 weight percent, up to about 2 weight percent, or up to about 1 weight percent porogen based on the total weight of monomers in the monomer mixture.

The aqueous phase composition contains an aqueous solvent mixture that includes water plus a mono-alcohol having 1 to 4 carbon atoms. Suitable mono-alcohols include methanol, ethanol, n-propanol, iso-propanol, tert-butanol, or a combination thereof. The mono-alcohol contributes, at least partially, to the total porosity of the macroporous cation exchange resins. That is, the porosity of the ion exchange resins tends to be higher with the addition of the mono-alcohol (i.e., the mono-alcohol can function as both a solvent and as a co-porogen).

At least 20 weight percent of the aqueous phase solvent mixture can be a mono-alcohol. In some embodiments, at least 30 weight percent, at least 40 weight percent, or at least 50 weight percent of the aqueous phase solvent mixture can be the mono-alcohol. Up to 80 weight percent, up to 70 weight percent, or up to 60 weight percent of the aqueous phase solvent mixture can be the mono-alcohol. For example, the amount of mono-alcohol can be in the range of 20 to 80 weight percent, 30 to 80 weight percent, 40 to 80 weight percent, or 50 to 80 weight percent of the aqueous phase solvent mixture.

The aqueous phase solvent mixture can also contain additional co-solvents that are miscible with water and the mono-alcohol. Suitable aqueous phase co-solvents include, but are not limited to, dimethylsulfoxide, dimethylformamide, N-methyl pyrrolidone, acetonitrile, and the like. The co-solvent can, for example, improve the solubility of some of the monomers such as the crosslinking monomer in the aqueous phase composition. The co-solvent can influence the phase separation behavior of the forming polymer, and influence the porosity characteristics of the resultant cation exchange resin.

The aqueous phase composition is dispersed or suspended in a non-polar organic solvent. The volume ratio of non-polar organic solvent to the aqueous phase composition is usually in the range of 2:1 to 6:1. The aqueous phase composition, which contains the monomer mixture and porogen, is often dispersed as relatively small droplets in the non-polar organic solvent. Besides functioning as an inert medium for dispersion of the aqueous phase composition, the primary purpose of the suspending medium (i.e., the non-polar organic solvent) is to dissipate the heat generated during the polymerization reaction. In some embodiments, the density of the suspension medium can be selected to be approximately the same as the aqueous phase composition. Approximately matching these densities tends to result in the formation of more spherical particles as well as more uniformly sized particles.

Suitable non-polar organic solvents are typically alkanes such as hexane, heptane, n-octane, isooctane, isododecane, and cyclohexane; halogenated hydrocarbons such as carbon tetrachloride, chloroform, and methylene chloride; aromatics such as benzene and toluene; low-viscosity silicone oils; or combinations thereof. For example, the non-polar organic solvent can be a mixture of heptane and methylene chloride or heptane and toluene.

A suspending agent (i.e., polymeric stabilizer) is often used to facilitate suspension of the aqueous phase composition droplets in the non-polar organic solvent. Unlike the porogen that is hydrophilic, the suspending agent usually has both hydrophobic and hydrophilic portions. The suspending agent functions to modify the interfacial tension between the aqueous phase composition and the non-polar organic solvent. Additionally, the suspending agent provides steric stabilization of the aqueous phase composition droplets. This steric stabilization tends to minimize or prevent the formation of agglomerated particles during the polymerization process.

Suitable suspending agents include sorbitan sesquioleate, polyethylene oxide (20) sorbitan trioleate, polyethylene oxide (20) sorbitan monooleate, sorbitan trioleate, sodium di-2-ethylhexylsulfosuccinate, a copolymer of isooctylacrylate and acrylic acid, a copolymer of hexylacrylate and sodium acrylate, a copolymer of isooctylacrylate and 2-acrylamidoisobutyramide, and the like. The amount of suspending agent can influence the size of the cation exchange resin (i.e., the use of larger amounts of suspending agent often results in the formation of smaller cation exchange resin particles). The amount of the suspending agent is generally 0.1 to 10 weight percent based on the total weight of the monomers in the monomer mixture. For example, the monomer mixture can contain 0.1 to 8 weight percent or 0.5 to 5 weight percent suspending agent based on the total weight of monomers.

The size of the cation exchange resin is determined, to a large extent, by the size of the aqueous phase composition droplets. The droplet size can be affected by variables such as the rate of agitation, the temperature, the amount of suspending agent, the choice of suspending agent, the choice of non-polar organic solvent, and the choice of any aqueous phase co-solvents. The rate of agitation, the type of suspending agent, and the amount of suspending agent can often be varied to control the aggregation or agglomeration of the resulting particles. A lack of aggregation is generally preferred.

An initiator can be added to the aqueous phase composition to commence the free radical polymerization reaction. The free radical initiator is usually soluble in the aqueous phase solvent mixture. Once the suspension has been formed, the free radical initiator can be activated thermally, photochemically, or through an oxidation-reduction reaction. The free radical initiator is often used in an amount of 0.02 to 10 weight percent based on the total weight of the monomers in the monomer mixture. In some examples, the free radical initiator is present in an amount of 2 to 6 weight percent based on the total weight of the monomers.

Suitable water-soluble thermal initiators include, for example, azo compounds, peroxides or hydroperoxides, persulfates, and the like. Exemplary azo compounds include 2,2'-azobis[2-(2-imidazolin-2-yl)propane] dihydrochloride, 2,2'-azobis(2-amidinopropane)dihydrochloride, and 4,4'-azobis-(4-cyanopentanoic acid). Examples of commercially available thermal azo compound initiators include materials available from DuPont Specialty Chemical (Wilmington, Del.) under the "VAZO" trade designation such as VAZO 44, VAZO 56, and VAZO 68. Suitable peroxides and hydroperoxides include acetyl peroxide, tert-butyl hydroperoxide, cumene hydroperoxide, and peroxyacetic acid. Suitable persulfates include, for example, sodium persulfate and ammonium persulfate.

In other examples, the free radical initiator is a redox couple such as ammonium or sodium persulfate and N,N,N',N'-tetramethylethylenediamine (TMEDA); ammonium or sodium persulfate and ferrous ammonium sulfate; hydrogen peroxide and ferrous ammonium sulfate; cumene hydroperoxide and N,N-dimethylaniline; or the like. The polymerization temperature typically depends on the specific free radical initiator chosen and on the boiling point of the non-polar organic solvent. The polymerization temperature is usually about 50° C. to about 150° C. for thermally initiated polymerizations. In some methods, the temperature is about 55° C. to about 100° C. For redox or photochemically initiated polymerizations, the temperature can be close to room temperature or below, if desired. The polymerization time can be about 30 minutes to about 24 hours or more. Typically, a polymerization time of 2 to 4 hours is sufficient.

Once the free radical polymerization reaction has been initiated, the forming polymeric material tends to precipitate within the aqueous phase composition. Some of the aqueous phase composition such as the porogen can get trapped in the pores of polymeric material. The particles of polymeric material can be isolated, for example, by filtration or decantation. The particles of polymeric material can then be subjected to a series of washing steps to remove the porogen. Suitable solvents for removing the porogen include polar solvents such as, for example, water, acetone, alcohols (e.g., methanol, ethanol, n-propanol, and iso-propanol), dimethylsulfoxide, dimethylformamide, N-methylpyrrolidone, acetonitrile, and the like. The resulting cation exchange resins can be dried using any suitable method, if desired. In some methods, the resulting cation exchange resins can be fractionated using techniques such as screening, sedimentation, and air classification.

The macroporous cation exchange resin particles can have an irregular shape or can be spherical or roughly spherical. In some examples, the macroporous cation exchange resin particles are beads. The average size of the particles can be determined using techniques such as light scattering or electron microscopy with image analysis. The particles usually have an average size of at least 10 micrometers. For example, the particles can have an average size of at least 20 micrometers, at least 30 micrometers, at least 40 micrometers, at least 50 micrometers, or at least 60 micrometers. The particles usually have an average size no greater than 2,000 micrometers, no greater than 1,000 micrometers, no greater than 500 micrometers, or no greater than 200 micrometers. In some applications, the macroporous cation exchange resins have an average particle size of 10 to 2,000 micrometers, 20 to 2,000 micrometers, 20 to 500 micrometers, 50 to 500 micrometers, 20 to 200 micrometers, 50 to 200 micrometer, 50 to 100 micrometers, 50 to 75 micrometers, 50 to 70 micrometers, or 60 to 70 micrometers.

If the average size of the macroporous cation exchange resin particles is less than about 10 micrometers or less than about 20 micrometers, then the back pressure in a chromatographic column filled with the particles may become unacceptably large, especially for the large columns (e.g., columns with a diameter greater than about 5 cm) that can be used for the purification or separation of large biological molecules. Although the average particle size can be as large as 2,000 micrometers, the average particle size for some applications (e.g., applications in which the macroporous cation exchange resins are placed in large columns) is often no greater than 200 micrometers. If the average particle size is larger, the efficiency of the chromatographic process may be low, especially for the purification or separation of large biological molecules such as proteins that often have low diffusion rates into the pores of the macroporous cation exchange resin. For example, to achieve the same degree of separation or purity with larger cation exchange resins that can be obtained using cation exchange resins of 20 to 200 micrometers, a greater amount of the resin, a longer chromatographic column, a slower flow rate, or a combination thereof may be needed.

The porosity and surface area of the anion exchange resin particles can be characterized by adsorbing nitrogen onto the surface of the particles at various relative pressures under cryogenic conditions (i.e., a sample of the anion exchange resin within a tube is subjected to a vacuum and the tube is placed in liquid nitrogen for cooling). Nitrogen is adsorbed on the surface of the sample at multiple relative pressures (e.g., from about 0.0 to about 1.0) and then desorbed at multiple relative pressures. BJH theory, which is further described in E. P. Barrett, L. S. Joyner, and P. P. Halenda, *J Am. Chem. Soc.*, 73, 373 (1951), can be used to relate the amount of nitrogen adsorbed or desorbed at the multiple relative pressures to pores having pore diameters in the range of about 2 to about 200 nanometers. The pore volume, surface area, and average pore diameter can be calculated. As used herein, the term "pore volume" refers to the cumulative pore volume calculated using BJH theory from the adsorption of nitrogen at various relative pressures from about 0.0 to about 1.0. As used herein, the term "surface area" refers to the cumulative surface area calculated using BJH theory from the adsorption of nitrogen at various relative pressures from about 0.0 to about 1.0. As used herein, the term "average pore diameter" is the average pore diameter measured using BJH theory from the adsorption of nitrogen at various relative pressures from about 0.0 to about 1.0.

The macroporous cation exchange resins have a distribution of pore sizes. The pore diameters can be up to 500 nanometers or larger. The cation exchange resins have pores in the size range that can be measured using nitrogen adsorption techniques. That is, at least some of the pores have a diameter less than 200 nanometers, less than 150 nanometers, or less than 100 nanometers. The average pore diameter measured by nitrogen adsorption is typically at least 2 nanometers, at least 5 nanometers, at least 10 nanometers, at least 20 nanometers, or at least 30 nanometers. The average pore diameter can be up to 200 nanometers, up to 100 nanometers, or up to 80 nanometers. For example, the average pore diameter can be in the range of 10 to 200 nanometers, in the range of 10 to 100 nanometers, in the range of 10 to 80 nanometers, in the range of 20 to 100 nanometers, or in the range of 20 to 80 nanometers. The pore size can be characterized using nitrogen adsorption at various relative pressures under cryogenic conditions.

The pore volume is often at least 0.10 cubic centimeters per gram. For example, the pore volume can be at least 0.15 cubic centimeters per gram, at least 0.20 cubic centimeters per gram, or at least 0.25 cubic centimeters per gram. The pore volume can be in the range of 0.10 to 2 cubic centimeters per gram, in the range of 0.15 to 2 cubic centimeters per gram, or in the range of 0.20 to 2 cubic centimeters per gram resulting from pores having a diameter no greater than 200 nanometers. The pores are large enough to accommodate the biological materials but small enough to provide adequate surface area and cation exchange capacity.

The surface area is usually at least 20 m$^2$/g, at least 30 m$^2$/g, or at least 40 m$^2$/g. The surface area is often in the range of 20 to 200 m$^2$/g, in the range of 30 to 200 m$^2$/g, in the range of 20 to 100 m$^2$/g, in the range of 30 to 100 m$^2$/g, or in the range of 40 to 200 m$^2$/g.

The cation exchange capacity of a cation exchange resin can be given in terms of the amount of a protein such as lysozyme or immunoglobin (e.g., IgG) that can be adsorbed. More particularly, some cation exchange resins have a lysozyme cation exchange capacity that is at least 50 mg/mL (i.e., 50 milligrams of lysozyme per milliliter of swollen cation exchange resin). For example, some cation exchange resins can have a lysozyme cation exchange capacity that is at least 75 mg/ml, at least 80 mg/ml, at least 90 mg/ml, or at least 100 mg/mL. More particularly, some cation exchange resins have a lysozyme cation exchange capacity of 50 to 250 mg/mL, 75 to 250 mg/mL, 90 to 250 mg/mL, or 90 to 200 mg/mL. Some cation exchange resins have an IgG cation exchange capacity that is at least 15 mg/mL. For example, some cation exchange resins can have an IgG cation exchange capacity of at least 30 mg/mL, at least 40 mg/mL, at least 55 mg/mL, at least 75 mg/mL, or at least 90 mg/mL. Some cation exchange resins have an IgG cation exchange capacity of 15 to 110 mg/mL, 40 to 110 mg/mL, 75 to 110 mg/mL, or 75 to 95 mg/mL.

The cation exchange resins prepared using the methods described herein are hydrophilic and usually have a low non-specific adsorption (i.e., cation exchange resins prepared from monomer with low LI tend to have low non-specific adsorption). The cation exchange resins typically adsorb various positively charged materials through interaction with the negatively charged groups on the cation exchange resin and typically adsorb little, if any, material on the non-ionic portions of the cation exchange resin. This low non-specific adsorption can advantageously result in better separation or purification of positively charged target materials from other materials in a sample. In some examples, the charged target materials are impurities such as cationic proteins or the like that need to be removed from a protein or nucleic acid solution.

In a second aspect, a method of separating or purifying a positively charged material is described. The method includes forming a macroporous cation exchange resin, contacting the macroporous cation exchange resin with positively charged material, and adsorbing at least a portion of the positively charged material on the macroporous cation exchange resin. The macroporous cation exchange resin is formed by preparing an aqueous phase composition that contains (a) a monomer mixture; (b) a water-soluble alkylene oxide or polyalkylene oxide porogen of Formula I; and (c) an aqueous phase solvent mixture that includes water and a mono-alcohol having 1 to 4 carbon atoms. The mono-alcohol is present in an amount of at least 20 volume percent based on the volume of the aqueous phase solvent mixture. The monomer mixture includes (1) a crosslinking monomer containing N,N'-alkylenebis(meth)acrylamide, N,N'-heteroalkylenebis(meth)acrylamide, or a combination thereof; and (2) a negatively charged ionic monomer. Substantially all of the monomers in the monomer mixture have a lipophilicity index less than or equal to 20. The formation of the macroporous cation exchange resin further includes suspending the aqueous phase composition in a non-polar organic solvent, polymerizing the monomer mixture to form particles of polymeric material, and removing the porogen from the particles.

A sample containing positively charged materials is usually contacted with a cation exchange resin at a pH where the cation exchange resin has negatively charged groups and the target molecule has a positively charged group. To release the adsorbed material from the cation exchange resin, the pH can be raised (e.g., the pH is raised to at least 6 or 7 or higher). Alternatively, when the charged material is a biomolecule, the sample can be contacted with the cation exchange resin in a low ionic strength buffer (e.g., 5 to 50 millimolar buffer salt plus 0 to 200 millimolar sodium chloride) at a pH of about 3 to 10 or at a pH of about 4 to 6. To release the adsorbed biomolecule, a high ionic strength buffer is contacted with the cation exchange resin. In some embodiments, the high ionic strength buffer includes that same buffer composition used to adsorb the material plus 1 molar sodium chloride. The adsorption and release processes are typically performed at temperatures near room temperature.

Buffer salts useful for controlling pH include, but are not limited to, sodium phosphate, sodium carbonate, sodium bicarbonate, sodium borate, sodium acetate, and TRIS (tris (hydroxymethyl)aminomethane). Other suitable buffers include "Good's" buffers such as MOPS (3-morpholinopropanesulfonic acid), EPPS (4-(2-hydroxyethyl)piperazine-1-propanesulfonic acid), MES (2-morpholinoethanesulfonic acid), and others.

Some samples include a biological molecule that can be separated from the other sample constituents or that can be purified. Suitable biological molecules include, for example, proteins, enzymes, vaccines, DNA, and RNA. Adjusting the pH of the sample can alter the charge of some biological molecules.

In a third aspect, a method of preparing a chromatographic column is described. The method includes forming a macroporous cation exchange resin and placing the macroporous cation exchange resin in a column. The macroporous cation exchange resin is formed by preparing an aqueous phase composition that contains (a) a monomer mixture; (b) a water-soluble alkylene oxide or polyalkylene oxide porogen of Formula I; and (c) an aqueous phase solvent mixture that includes water and a mono-alcohol having 1 to 4 carbon atoms. The mono-alcohol is present in an amount of at least 20 volume percent based on the volume of the aqueous phase solvent mixture. The monomer mixture includes (1) a crosslinking monomer containing N,N'-alkylenebis(meth)acrylamide, N,N'-heteroalkylenebis(meth)acrylamide, or a combination thereof; and (2) a negatively charged ionic monomer. Substantially all of the monomers in the monomer mixture have a lipophilicity index less than or equal to 20. The formation of the macroporous cation exchange resin further includes suspending the aqueous phase composition in a non-polar organic solvent, polymerizing the monomer mixture to form particles of polymeric material, and removing the porogen from the particles.

The cation exchange resin particles prepared by the method described herein tend to be fairly rigid and have the mechanical strength needed for use in chromatographic columns of any suitable dimension and under any suitable flow rates and pressure conditions. The particles can be used, for example, in a chromatographic column with high flow rates. The cation exchange resins are suitable for use under the differential pressure conditions that are commonly encountered in chromatographic columns. As used herein, the term "differential pressure" refers to the pressure drop across a chromatographic column. For example, chromatographic columns used for the downstream purification or separation of therapeutic proteins can be used with superficial velocities (e.g., flow rates) such as at least 150 cm/hr, at least 250 cm/hr, at least 500 cm/hr, or at least 700 cm/hr to increase productivity. Faster flow rates typically lead to higher productivity.

In small chromatographic columns (e.g., columns with a diameter less than about 5 cm), the packed bed of cation exchange resin is well supported by the column wall. In such columns, cation exchange resins having a relatively wide range of rigidity can withstand differential pressures in excess of 200 psi (1,380 kPa). However, in large chromatographic columns (e.g., columns with a diameter greater than about 5 cm), the packed bed of cation exchange resin has less support from the column wall (e.g., a smaller fraction of the resin is in contact with the wall surfaces of the column). In such columns, cation exchange resins with higher rigidity tend to be able to withstand differential pressures of at least 25 psi (173 kPa). Some cation exchange resins can withstand a differential pressure of 50 psi (345 kPa) to 200 psi (1,380 kPa).

Suitable columns are known in the art and can be constructed of such materials as glass, polymeric material, stainless steel, titanium and alloys thereof, or nickel and alloys thereof. Methods of filling the column to effectively pack the cation exchange resin in the column are known in the art.

The chromatographic columns can be part of an analytical instrument such as a liquid chromatograph. When packed with the cation exchange resin, the chromatographic column can be used to separate an ionic material from non-ionic materials or to separate one ionic material from another ionic material with a different charge density. The amount of the ionic material in the sample can be determined.

The chromatographic columns can be part of a preparative liquid chromatographic system to separate or purify an ionic material. The preparative liquid chromatographic system can be a laboratory scale system, a pilot plant scale system, or an industrial scale system.

In a fourth aspect, a method of preparing a filtration element is described. The method includes forming a macroporous cation exchange resin and disposing the macroporous cation exchange resin on a surface of a filtration medium. The macroporous cation exchange resin is formed by preparing an aqueous phase composition that contains (a) a monomer mixture; (b) a water-soluble alkylene oxide or polyalkylene oxide porogen of Formula I; and (c) an aqueous phase solvent mixture that includes water and a mono-alcohol having 1 to 4 carbon atoms. The mono-alcohol is present in an amount of at least 20 volume percent based on the volume of the aqueous phase solvent mixture. The monomer mixture includes (1) a crosslinking monomer containing N,N'-alkylenebis(meth)acrylamide, N,N'-heteroalkylenebis(meth)acrylamide, or a combination thereof; and (2) a negatively charged ionic monomer. Substantially all of the monomers in the monomer mixture have a lipophilicity index less than or equal to 20. The formation of the macroporous cation exchange resin further includes suspending the aqueous phase composition in a non-polar organic solvent, polymerizing the monomer mixture to form particles of polymeric material, and removing the porogen from the particles.

The filter element can be positioned within a housing to provide a filter cartridge. Suitable filtration medium and systems that include a filter cartridge are further described, for example, in U.S. Pat. No. 5,468,847 (Heilmann et al.), incorporated herein by reference. Such a filter cartridge can be used to purify or separate biomolecules. In this aspect, less rigid particles or smaller macroporous particles can be utilized than in the chromatographic column format due to the lower pressure drops inherent in the filter cartridge system.

The filtration medium can have a single filtration layer or multiple filtration layers and can be prepared from glass or polymeric fibers (e.g., polyolefin fibers such as polypropylene fibers). In some embodiments, the filtration medium includes a coarse pre-filtration layer and one or more finer filtration layers. For example, the filtration medium can include a coarse pre-filtration layer and then a series of additional filtration layers with progressively smaller average pore sizes. The cation exchange resin can be positioned on the layer of the filtration medium having the smallest average pore size.

Selection of the pore size of the filtration medium depends on the size of the cation exchange resin. Typically the pore size of the filtration medium is selected to be smaller than the average diameter of the cation exchange resin. However, a portion of the cation exchange resin can penetrate into the filtration medium.

The filtration medium can be in the form of vertical pleated filters such as those described in U.S. Pat. No. 3,058,594 (Hultgren). In other embodiments, the filtration medium is in the form of horizontal, compound radially pleated filters such as those described in U.S. Pat. No. 4,842,739 (Tang et al.), incorporated herein by reference. A horizontal arrangement of the pleats can be desirable in applications where a filter cartridge containing the filtration medium is used in the vertical direction. Such an arrangement can reduce the loss of the cation exchange resin from the filter element during use and storage.

In a fifth aspect, a method of making a porous composite material is described. The method includes forming a macroporous cation exchange resin and incorporating the macroporous cation exchange resin in a continuous, porous matrix. The macroporous cation exchange resin is formed by preparing an aqueous phase composition that contains (a) a monomer mixture; (b) a water-soluble alkylene oxide or polyalkylene oxide porogen of Formula I; and (c) an aqueous phase solvent mixture that includes water and a mono-alcohol having 1 to 4 carbon atoms. The mono-alcohol is present in an amount of at least 20 volume percent based on the volume of the aqueous phase solvent mixture. The monomer mixture includes (1) a crosslinking monomer containing N,N'-alkylenebis(meth)acrylamide, N,N'-heteroalkylenebis(meth)acrylamide, or a combination thereof; and (2) a negatively charged ionic monomer. Substantially all of the monomers in the monomer mixture have a lipophilicity index less than or equal to 20. The formation of the macroporous cation exchange resin further includes suspending the aqueous phase composition in a non-polar organic solvent, polymerizing the monomer mixture to form particles of polymeric material, and removing the porogen from the particles.

The continuous, porous matrix is typically a woven or non-woven fibrous web, porous fiber, porous membrane, porous film, hollow fiber, or tube. Suitable continuous, porous matrixes are further described in U.S. Pat. No. 5,993,935 (Rasmussen et al.), incorporated herein by reference.

A continuous, porous matrix that is a fibrous web can provide such advantages as, for example, large surface area, ease of manufacture, low material cost, and a variety of fiber textures and densities. Although a wide range of fiber diameters is suitable, the fibers often have an average diameter of 0.05 micrometers to 50 micrometers. The web thickness can be varied to fit the end use application (e.g., about 0.2 micrometers to about 100 cm).

The composite material can be prepared, for example, using melt-blowing methods. For example, a molten polymeric material can be extruded to produce a stream of melt blown fibers. The cation exchange resin can be introduced into the stream of fibers and intermixed with the fibers. The mixture of fibers and cation exchange resin can be collected on a screen such that a web is formed. The cation exchange resin can be dispersed within the fibrous web. In some embodiments, the cation exchange resin can be dispersed uniformly throughout the fibrous web.

The composite material can also be prepared with a fibrillated polymer matrix such as fibrillated polytetrafluoroethylene (PTFE). Suitable methods are more fully described in U.S. Pat. No. 4,153,661 (Ree et al.); U.S. Pat. No. 4,565,663 (Errede et al.); U.S. Pat. No. 4,810,381 (Hagen et al.); and U.S. Pat. No. 4,971,736 (Hagen et al.), all of which are incorporated herein by reference. In general, these methods involve blending the cation exchange resin with a polytetrafluoroethylene dispersion to obtain a putty-like mass, subjecting the putty-like mass to intensive mixing at a temperature of 5° C. to 100° C. to cause fibrillation of the PTFE, biaxially calendaring the putty-like mass, and drying the resultant sheet.

In another method of preparing the composite material, the cation exchange resin can be dispersed in a liquid and then blended with a thermoplastic polymer at a temperature sufficient to form a homogenous mixture. The homogeneous mixture can be placed in a mold having a desired shape. Upon cooling of the mixture, the liquid can be phase separated leaving a thermoplastic polymeric matrix that contain dispersed cation exchange resin particles. This method is further described in U.S. Pat. No. 4,957,943 (McAllister et al.), incorporated herein by reference.

The amount of cation exchange resin incorporated into the continuous, porous matrix is at least 1 volume percent, at least 5 volume percent, at least 10 volume percent, at least 20 volume percent, at least 30 volume percent, at least 40 volume percent, or at least 50 volume percent based on the volume of the resulting composite. The amount of cation exchange resin incorporated into the continuous, porous matrix can contain up to 99 volume percent, up to 95 volume percent, up to 90 volume percent, up to 85 volume percent, or up to 80 volume percent based on the volume of the resulting composite. Composites having a larger amount of cation exchange resin tend to have a larger cation exchange capacity.

The foregoing describes the invention in terms of embodiments foreseen by the inventor for which an enabling description was available, notwithstanding that insubstantial modifications of the invention, not presently foreseen, may nonetheless represent equivalents thereto.

EXAMPLES

These examples are merely for illustrative purposes only and are not meant to be limiting on the scope of the appended claims. All parts, percentages, ratios, and the like in the examples are by weight, unless noted otherwise. Solvents and other reagents used were obtained from Sigma-Aldrich Chemical Company, Milwaukee, Wis. unless otherwise noted.

Test Methods

Cation Exchange Capacity for Lysozyme

A polypropylene disposable chromatography column with dimensions of 0.8 centimeter by 4 centimeter was packed with an aqueous slurry of beads to provide a 1 mL bed of cation exchange resin. The chromatography column was obtained from Bio-Rad Laboratories of Hercules, Calif. under the trade designation POLY-PREP COLUMN. The column bed was equilibrated by washing with 10 mL of loading buffer, which is a solution of 10 mM MOPS (4-morpholinopropanesulfonic acid) at pH 7.5. The column bed was then loaded with 30 mL of protein solution (chicken egg white lysozyme, approx. 95% purity, Sigma Chemical Co., St. Louis, Mo.) having a concentration of 12 mg/mL in the MOPS buffer. All buffer and protein solutions were prepared in deionized water. Any unbound lysozyme was washed off with 30 mL of the MOPS buffer (three 10 mL fractions). Finally, bound protein was eluted with 15 mL of 1M NaCl in MOPS buffer.

The amount of protein recovered in the various fractions was determined by measuring the UV absorbance at 280 nm using a Hewlett-Packard Diode Array Spectrophotometer, Model 8452A. A standard curve was prepared using pure lysozyme. The amount of protein recovered in the NaCl eluate was equated to the cation exchange capacity for the cation exchange resin.

Cation Exchange Capacity for Immunoglobulin G (IgG)

A 50 volume percent slurry of cation exchange resin beads in DI water was prepared by mixing the beads with water, centrifuging the mixture at 3,000 relative centrifugal force (rcf) for 20 minutes, and then adjusting the amount of water so that the total volume was twice that of the packed bead bed.

The slurry was mixed well to suspend the beads, then a 400 microliter sample of the slurry was pipetted into a 5 milliliter cellulose acetate CENTREX MF centrifugal micro-filter having a pore size of 0.45 micrometer. The micro-filter was obtained from Schleicher & Schuell through VWR, Eagan, Minn. The water was removed from the slurry on the micro-filter by centrifugation at 3,000 rcf for 5 minutes. A solution of 4 mL of 50 mM sodium acetate at pH 4.5 that contained 80 mM sodium chloride was mixed with the beads on the micro-filter. The liquid was removed by centrifugation again at 3,000 rcf for 10 minutes. The filtrates were discarded. A 4.5 mL sample of human IgG (about 9 mg/mL) (commercially available from Equitech-Bio, Kerrville, Tex.) in the same acetate buffer was added to the micro-filter containing the beads. The mixture was tumbled overnight and then the supernatant was removed from the beads by centrifugation at 3,000 rcf for 20 minutes.

The filtrate was analyzed by UV spectroscopy, comparing the absorbance at 280 nm to that of the starting IgG solution; the difference was used to calculate the IgG cation exchange capacity of the beads. Assays were run in triplicate and averaged.

Surface Area and Porosity Measurements

Approximately 0.1-1.0 g of each sample was transferred to a 1.3 centimeters (0.5 inch) diameter sample tube available from Micromeritics, Inc. of Norcross, Ga. and degassed using a system commercially available from Micromeritics under the trade designation VACPREP 061 for 24 hours at 100° C. under vacuum (below 10 mTorr or 0.015 mbar). After degassing, the samples were allowed to cool for 10 minutes under vacuum at ambient temperature (i.e., 20° C. to 25° C.), and then loaded onto a surface area and porosity analyzer commercially available from Micromeritics under the trade designation TRISTAR 3000.

A 45 point adsorption/40 point desorption isotherm was set up with relative pressures ($P/P_o$) starting at about 0.0 up to about 1.0 with a tighter distribution of points between 0.95 and 1.0 (See Table for Target Pressures and Points). No first "pressure fixed dose" was set. The maximum volume increment was set at 10.00 cc/g at STP, the "absolute pressure tolerance" was set at 5 mm Hg, and the "relative pressure tolerance" was set at 2.0%. "Fast evacuation" and "leak test" options were not used. With the dewar of liquid nitrogen lowered (i.e., the sample was not in the liquid nitrogen), an evacuation time of 0.5 hours was implemented during the free space measurement. The dewar was raised for analysis (i.e., the tube containing the sample was placed in liquid nitrogen). At 77.350 K (the temperature of liquid nitrogen), $P_o$ was measured at 120 min intervals during the analysis. The gas adsorptive properties using a standard Pstat versus temperature table for nitrogen gas were set at the following values: non-ideality factor, 0.0000620; density conversion factor, 0.0015468; molecular cross-sectional area, 0.162 $nm_2$. BJH adsorption/desorption cumulative pore volumes and cumulative surface areas were calculated for pores between 17Å-2,000 Å diameter (corresponding to pores between 2 and 200 nanometers), and based on quantity of $N_2$ adsorbed at each relative pressure during the 45 adsorption points and 40 desorption points.

The following table indicates the adsorption and desorption points used for the analysis. The cumulative surface area and cumulative pore volume during adsorption are reported below for various examples.

Table of Target Pressures and Points

| Point | Relative Pressure (P/Po) | BJH Adsorption | BJH Desorption |
|---|---|---|---|
| 1 | 0.060 | X | |
| 2 | 0.080 | X | |
| 3 | 0.120 | X | |
| 4 | 0.140 | X | |
| 5 | 0.160 | X | |
| 6 | 0.200 | X | |
| 7 | 0.250 | X | |
| 8 | 0.300 | X | |
| 9 | 0.350 | X | |
| 10 | 0.400 | X | |
| 11 | 0.450 | X | |
| 12 | 0.500 | X | |
| 13 | 0.550 | X | |
| 14 | 0.600 | X | |
| 15 | 0.650 | X | |
| 16 | 0.700 | X | |
| 17 | 0.740 | X | |
| 18 | 0.770 | X | |
| 19 | 0.800 | X | |
| 20 | 0.820 | X | |
| 21 | 0.840 | X | |
| 22 | 0.860 | X | |
| 23 | 0.875 | X | |
| 24 | 0.890 | X | |
| 25 | 0.905 | X | |
| 26 | 0.915 | X | |
| 27 | 0.925 | X | |
| 28 | 0.933 | X | |
| 29 | 0.940 | X | |
| 30 | 0.947 | X | |
| 31 | 0.953 | X | |
| 32 | 0.959 | X | |
| 33 | 0.964 | X | |
| 34 | 0.968 | X | |
| 35 | 0.971 | X | |
| 36 | 0.974 | X | |
| 37 | 0.977 | X | |
| 38 | 0.980 | X | |
| 39 | 0.982 | X | |
| 40 | 0.984 | X | |
| 41 | 0.986 | X | |
| 42 | 0.988 | X | |
| 43 | 0.989 | X | |
| 44 | 0.990 | X | |
| 45 | 1.000 | | |
| 46 | 0.990 | | X |
| 47 | 0.989 | | X |
| 48 | 0.988 | | X |
| 49 | 0.986 | | X |
| 50 | 0.984 | | X |
| 51 | 0.982 | | X |
| 52 | 0.980 | | X |
| 53 | 0.977 | | X |
| 54 | 0.974 | | X |
| 55 | 0.971 | | X |
| 56 | 0.968 | | X |
| 57 | 0.964 | | X |
| 58 | 0.959 | | X |
| 59 | 0.953 | | X |
| 60 | 0.947 | | X |
| 61 | 0.940 | | X |
| 62 | 0.933 | | X |
| 63 | 0.925 | | X |
| 64 | 0.915 | | X |
| 65 | 0.905 | | X |
| 66 | 0.890 | | X |
| 67 | 0.875 | | X |
| 68 | 0.860 | | X |
| 69 | 0.840 | | X |
| 70 | 0.820 | | X |
| 71 | 0.800 | | X |
| 72 | 0.770 | | X |
| 73 | 0.740 | | X |
| 74 | 0.700 | | X |

-continued

Table of Target Pressures and Points

| Point | Relative Pressure (P/Po) | BJH Adsorption | BJH Desorption |
|---|---|---|---|
| 75 | 0.650 | | X |
| 76 | 0.600 | | X |
| 77 | 0.550 | | X |
| 78 | 0.500 | | X |
| 79 | 0.450 | | X |
| 80 | 0.400 | | X |
| 81 | 0.350 | | X |
| 82 | 0.300 | | X |
| 83 | 0.250 | | X |
| 84 | 0.200 | | X |
| 85 | 0.140 | | X |

Table of Abbreviations

| Abbreviation or Trade Designation | Description |
|---|---|
| MBA | N,N'-methylenebisacrylamide |
| EBA | N,N'-ethylenebisacrylamide |
| AMPS | 2-acrylamido-2-methylpropanesulfonic acid commercially available as a 50% aqueous solution of the sodium salt, AMPS 2405 Monomer, from Lubrizol Corp., Wickliffe, Ohio. |
| AA | Acrylic acid |
| IPA | Isopropanol |
| TMEDA | N,N,N',N'-tetramethylethylenediamine. |
| PEG 200 | Polyethylene glycol with hydroxy end groups, average molecular weight 200 g/mole |
| PEG 400 | Polyethylene glycol with hydroxy end groups, average molecular weight 400 g/mole |
| PEG 600 | Polyethylene glycol with hydroxy end groups, average molecular weight 600 g/mole |
| PEG 1000 | Polyethylene glycol with hydroxy end groups, average molecular weight 1,000 g/mole |
| PEG 2000 | Polyethylene glycol with hydroxy end groups, average molecular weight 2,000 g/mole |
| PEG 3400 | Polyethylene glycol with hydroxy end groups, average molecular weight 3,400 g/mole |
| PEG 4600 | Polyethylene glycol with hydroxy end groups, average molecular weight 4,600 g/mole |
| PEG 6000 | Polyethylene glycol with hydroxy end groups, average molecular weight 6,000 g/mole |
| PEG 8000 | Polyethylene glycol with hydroxy end groups, average molecular weight 8,000 g/mole |
| PEGME 350 | Polyethylene glycol monomethylether (one hydroxy end group and one methoxy end group), average molecular weight 350 g/mole |
| PEGBCME | Polyethyleneglycol-bis-carboxymethyl ether with carboxy end groups, average molecular weight 600 g/mole |
| DPG | Dipropylene glycol |
| PPG 425 | Polypropyleneglycol with hydroxy end groups, average molecular weight 425 g/mole |
| PEG-PPG | Ethylene glycol/propylene glycol copolymer with hydroxy end groups, average molecular weight about 980 g/mole, available from Union Carbide as UCON 77-H-450 |
| Diglyme | Diethylene glycol dimethylether |
| Brij 78 | Polyethyleneglycol octadecyl ether with one octadecyloxy end group and one hydroxy end group, containing approximately 20 ethyleneglycol units |
| EG | Ethylene glycol |
| DEG | Diethylene glycol |
| TEG | Triethylene glycol |
| DMA | Dimethylacrylamide |
| NiPAAm | N-Isopropylacrylamide |

Example 1

A 65:35 by weight AMPS/MBA copolymer was prepared by reverse-phase suspension polymerization using a polyethylene glycol porogen (PEG 400) in the aqueous phase composition.

A polymeric stabilizer (0.56 grams), toluene (188 mL), and heptane (348 mL) were added to a flask equipped with a mechanical stirrer (stirring rate 450 rpm), nitrogen inlet, thermometer, heating mantel with temperature controller, and condenser. The polymeric 10 stabilizer was a 91.8:8.2 by weight copolymer of isooctylacrylate and 2-acrylamido-isobutyramide (prepared as described in Rasmussen, et al., Makromol. Chem., Macromol. Symp., 54/55, 535-550 (1992)). The non-aqueous solution in the flask was heated to 35° C. with stirring, and sparged with nitrogen for 15 minutes.

An aqueous solution was prepared that contained MBA (9.8 grams), AMPS (36.4 grams of a 50 percent by weight aqueous solution), IPA (100 mL), deionized water (26.8 mL), and PEG 400 (15 mL). This aqueous solution was stirred and heated at 30-35° C. to dissolve the MBA. Sodium persulfate (0.5 grams) dissolved in deionized water (5 mL) was added to the aqueous solution with additional stirring. The aqueous solution was added to the reaction flask containing the non-aqueous solution. The resulting mixture was stirred and nitrogen sparged for 5 minutes.

TMEDA (0.5 mL) was added to initiate the polymerization. The reaction temperature quickly rose to 46.3° C. and then slowly subsided. The reaction mixture was stirred for a total of 2 hours from the time of TMEDA addition, filtered using a sintered glass funnel, washed with acetone (2×250 mL), washed with methanol (2×250 mL), washed with acetone (250 mL), and dried at room temperature under vacuum to yield 31.7 grams of colorless particles. Percent solids determination using an Ohaus moisture balance indicated the product was 90.4 weight percent solids.

Cation exchange capacity was determined by the method described above using two different proteins, lysozyme (MW=14,000 grams/mole) and IgG (MW=150,000 grams/mole). Surface area and porosity measurements were performed as described above. These data are presented in Table 1.

Comparative Example C1

A copolymer of MBA with AMPS was prepared by reverse phase suspension polymerization as described in Example 1, except that no porogen (e.g., no PEG 400) was added to the aqueous solution. Cation exchange capacity for IgG and lysozyme as well as the porosity measurements are listed in Table 1.

Example 2

A copolymer of MBA with AMPS was prepared by reverse phase suspension polymerization as described in Example 1, except that the amount of PEG 400 added to the aqueous solution was increased to 30 mL. Cation exchange capacity for IgG and lysozyme as well as the porosity measurements are listed in Table 1.

Example 3

For Example 3, the same procedure used for Example 1 was followed except that the only solvent in the non-aqueous phase was heptane (536 mL). Cation exchange capacity for IgG and lysozyme as well as the porosity measurements are listed in Table 1.

Comparative Example C2

A copolymer of MBA with AMPS was prepared by reverse phase suspension polymerization as described in Example 3, except that no porogen (e.g., no PEG 400) was added to the aqueous solution and the IPA was replaced by an equivalent amount of deionized water. Cation exchange capacity for IgG and lysozyme as well as the porosity measurements are listed in Table 1.

Comparative Example C3

A copolymer of MBA with AMPS was prepared by reverse phase suspension polymerization as described in Example 3, except that the IPA was replaced by an equivalent amount of deionized water. Cation exchange capacity for IgG and lysozyme as well as the porosity measurements are listed in Table 1.

TABLE 1

| Example | Lysozyme capacity (mg/mL) | IgG capacity (mg/mL) | BJH Cumulative Surface Area ($m^2/g$) | BJH Cumulative Pore Volume (cc/g) |
|---|---|---|---|---|
| C1 | 25 | 7 | 2.6 | 0.01 |
| 1 | 106 | 37 | 40.8 | 0.36 |
| 2 | 75 | 57 | 96.1 | 0.61 |
| 3 | NM | 64 | 74.6 | 0.48 |
| C2 | NM | 8 | <0.01 | <0.01 |
| C3 | NM | 4 | <0.01 | <0.01 |

NM = Not measured

Examples 4 to 15

Copolymers of MBA with AMPS were prepared by reverse phase suspension polymerization as described in Example 1, except that 20 milliliters of a 50 weight percent solution deionized water of the porogen listed in Table 2 was added to the aqueous solution and only 16.8 mL of additional deionized water was added. Cation exchange capacities for lysozyme and IgG as well as the porosity measurements are listed in Table 2.

Figure 2:
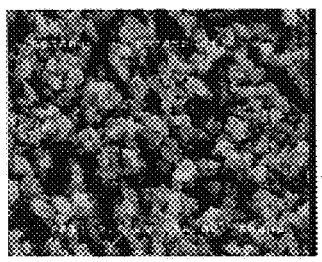
FIG. 2 shows a scanning electron micrograph of one exemplary macroporous cation exchange resin with a magnification of 50,000×. The macroporous cation exchange resin was prepared using a polyethylene glycol porogen having an average molecular weight of 1,000 g/mole.
Figure 3:
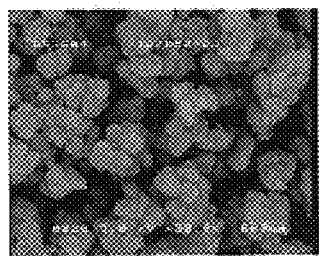
FIG. 3 shows a scanning electron micrograph of one exemplary macroporous cation exchange resin with a magnification of 50,000×. The macroporous cation exchange resin was prepared using a polyethylene glycol porogen having an average molecular weight of 3,400 g/mole.
Figure 4:
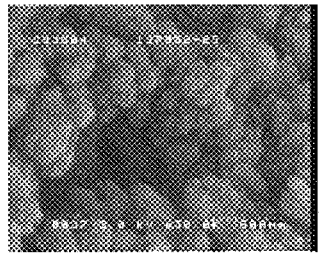
FIG. 4 shows a scanning electron micrograph of one exemplary macroporous cation exchange resin with a magnification of 50,000×. The macroporous cation exchange resin was prepared using a polyethylene glycol porogen having an average molecular weight of 6,000 g/mole.

The scanning electron micrograph of the surface of Example 4 is shown in FIG. 1 at a magnification of 50,000×. The scanning micrographs of the surface of Example 7, Example 9, and Example 11 are shown respectively in FIG. 2, FIG. 3, and FIG. 4 at a magnification of 50,000×.

TABLE 2

| Example | Porogen Added | Lysozyme capacity (mg/mL) | IgG capacity (mg/mL) | BJH Cumulative Surface Area ($m^2/g$) | BJH Cumulative Pore Volume (cc/g) |
|---|---|---|---|---|---|
| 4 | PEG 200 | 106 | 58 | 88 | 0.52 |
| 5 | PEG 400 | 115 | 86 | 35 | 0.32 |
| 6 | PEG 600 | 117 | 76 | 75 | 0.58 |
| 7 | PEG 1000 | 102 | 65 | 79 | 0.39 |
| 8 | PEG 2000 | 39 | 20 | 1 | 0.02 |
| 9 | PEG 3400 | 19 | 25 | 6 | 0.04 |
| 10 | PEG 4600 | 18 | 22 | 5 | 0.02 |
| 11 | PEG 6000 | 26 | 27 | 2 | 0.02 |
| 12 | PEG 8000 | 27 | 15 | 6 | 0.02 |
| 13 | EG | 132 | 59 | 137 | 0.83 |
| 14 | DEG | 85 | 59 | 135 | 0.70 |
| 15 | TEG | NM | 51 | 141 | 0.77 |

NM = Not measured

Examples 16 to 22

For Examples 16 to 22, the same procedure used for Examples 4 to 15 was followed except that PEG 400 was added to the aqueous phase composition in the amounts shown in Table 3. Amounts of IPA and Deionized water were adjusted so that the total volume of IPA plus PEG was 110 mL and the total water was 50 mL. Cation exchange capacities for IgG and the porosity measurements are listed in Table 3.

TABLE 3

| Example | Amount of PEG 400 Added (grams) | IgG capacity (mg/mL) | BJH Cumulative Surface Area ($m^2/g$) | BJH Cumulative Pore Volume (cc/g) |
|---|---|---|---|---|
| 16 | 1.0 | 56 | 54 | 0.31 |
| 17 | 2.5 | 63 | 46 | 0.29 |
| 18 | 5.0 | 69 | 60 | 0.37 |
| 19 | 10.0 | 71 | 73 | 0.50 |
| 20 | 15.0 | 74 | 73 | 0.33 |
| 21 | 20.0 | 77 | 59 | 0.32 |
| 22 | 25.0 | 75 | 68 | 0.21 |

Example 23 to 25

For Examples 23 to 25, the same procedure used for Examples 16 to 22 was followed except that PEG 3400 was added to the aqueous phase composition in the amounts shown in Table 4. Cation exchange capacities for IgG and the porosity measurements are listed in Table 4.

TABLE 4

| Example | Amount of PEG 3400 Added (grams) | IgG capacity (mg/mL) | BJH Cumulative Surface Area ($m^2/g$) | BJH Cumulative Pore Volume (cc/g) |
|---|---|---|---|---|
| 23 | 1.0 | 55 | 38 | 0.26 |
| 24 | 2.5 | 47 | 31 | 0.19 |
| 25 | 5.0 | 36 | 17 | 0.12 |

Examples 26 and 27

For Examples 26 and 27, the same procedure used for Examples 16-22 was followed except that PEGME 350 was added to the aqueous phase composition in the amounts shown in Table 5. Cation exchange capacities for IgG and the porosity measurements are listed in Table 5.

TABLE 5

| Example | Amount of PEGME 350 Added (grams) | IgG capacity (mg/mL) | BJH Cumulative Surface Area ($m^2/g$) | BJH Cumulative Pore Volume (cc/g) |
|---|---|---|---|---|
| 26 | 2.5 | 72 | 42 | 0.30 |
| 27 | 10 | 57 | 32 | 0.21 |

Examples 28 to 35

For Examples 28 to 35, the same procedure used for Examples 16 to 22 was followed except that the identity and amount of added porogen was varied as shown in Table 6. Cation exchange capacities for IgG are listed in Table 6.

TABLE 6

| Example | Porogen Identity | Porogen Amount (mL) | IgG capacity (mg/mL) | BJH Cumulative Surface Area (m²/g) | BJH Cumulative Pore Volume (cc/g) |
|---|---|---|---|---|---|
| 28 | DPG | 5 | 63 | 97 | 0.49 |
| 29 | PPG 425 | 1 | 72 | 50 | 0.33 |
| 30 | PPG 425 | 10 | 44 | 17 | 0.08 |
| 31 | PEGBCME | 5 | 62 | 70 | 0.39 |
| 32 | PEG-PPG | 1 | 65 | 69 | 0.43 |
| 33 | Diglyme | 5 | 67 | 55 | 0.37 |
| 34 | Brij 78 | 1 | 53 | 10 | 0.11 |
| 35 | EG/PEG 3400 | 10/5 | 69 | 65 | 0.47 |

Example 36 to 39

Copolymeric beads of MBA and AMPS were prepared as described in Example 1 but with increasing amounts of the monovinylic monomer DMA, which replaced some of the MBA. The amount of AMPS remained constant at 65 percent by weight. The porogen used was 15 mL of PEG 400. The amount of IPA used was 80 mL and the total water content in the aqueous phase composition was 55 mL. Cation exchange capacities for IgG are listed in Table 7.

TABLE 7

| Example | MBA Monomer (relative parts) | DMA Monomer (relative parts) | AMPS Monomer (relative parts) | IgG capacity (mg/mL) |
|---|---|---|---|---|
| 36 | 30 | 5 | 65 | 106 |
| 37 | 25 | 10 | 65 | 9 |
| 38 | 20 | 15 | 65 | 13 |
| 39 | 15 | 20 | 65 | 12 |

Example 40 and 41

Copolymeric beads of MBA and AMPS were prepared as described in Example 1 but with increasing amounts of the monomer NiPAAm, which replaced some of the MBA. The amount of AMPS remained constant at 65 percent by weight. The porogen used was 15 mL of PEG 400. The amount of IPA used was 80 mL. The total water content in the aqueous phase composition was 55 mL. Cation exchange capacities for IgG are listed in Table 8.

TABLE 8

| Example | MBA Monomer (relative parts) | NiPAAm Monomer (relative parts) | AMPS Monomer (relative parts) | IgG capacity (mg/mL) |
|---|---|---|---|---|
| 40 | 30 | 5 | 65 | 44 |
| 41 | 25 | 10 | 65 | 20 |

Examples 42 to 53

Copolymeric beads of MBA and AMPS were prepared by varying the weight percentages of the two monomers MBA:AMPS from 95:5 to 5:95 while keeping the quantities of total monomer, PEG 400, IPA and water the same as described for Examples 40 and 41. Cation exchange capacities for IgG are listed in Table 9.

TABLE 9

| Example | MBA Monomer (relative parts) | AMPS Monomer (relative parts) | IgG capacity (mg/mL) |
|---|---|---|---|
| 42 | 95 | 5 | 17 |
| 43 | 85 | 15 | 34 |
| 44 | 82 | 18 | 55 |
| 45 | 78 | 22 | 36 |
| 46 | 75 | 25 | 25 |
| 47 | 72 | 28 | 63 |
| 48 | 65 | 35 | 64 |
| 49 | 55 | 45 | 76 |
| 50 | 45 | 55 | 84 |
| 51 | 35 | 65 | 80 |
| 52 | 25 | 75 | 87 |
| 53 | 15 | 85 | 69 |

Example 54

A cation exchange bead was prepared as described in Example 20, except that EBA was substituted for MBA. The cation exchange capacity for IgG was 116 mg/mL. Cumulative pore volume was 0.38 cubic centimeters per gram, and cumulative surface area was measured at 80 square meters per gram.

Example 55

A cation exchange bead was prepared as described in Example 20, except that AA was substituted for AMPS. Cation exchange capacity for IgG was measured as described in the Test Methods, except that 20 mM MOPS, pH 7.5 buffer was substituted for the acetate buffer used with the AMPS beads. IgG capacity was 74 mg/mL.

We claim:
1. A method of preparing a macroporous cation exchange resin, the method comprising:
  forming an aqueous phase composition comprising
    a) a monomer mixture comprising
      i) a crosslinking monomer comprising N,N'-alkylenebis(meth)acrylamide, N,N'-heteroalkylenebis(meth)acrylamide, or a combination thereof in an amount in a range of 15 to 90 weight percent based on a weight of monomers in the monomer mixture; and
      ii) a negatively charged ionic monomer,
    wherein substantially all the monomers in the monomer mixture have a lipophilicity index less than or equal to 20; and
    b) a water-soluble porogen of Formula I

$R^1—(R^2—O)_n—R^3$     (I)

wherein
      $R^1$ is hydroxy, alkoxy, carboxy, acyloxy, or halo;
      each $R^2$ is independently an alkylene having 1 to 4 carbon atoms;
      $R^3$ is hydrogen, alkyl, carboxyalkyl, acyl, or haloalkyl; and
      n is an integer of 1 to 1,000; and
    c) an aqueous phase solvent mixture comprising water and a mono-alcohol having 1 to 4 carbon atoms, wherein the mono-alcohol is present in an amount of at least 20 weight percent based on a total weight of the aqueous phase solvent mixture;

suspending the aqueous phase composition in a non-polar organic solvent;

polymerizing the monomer mixture to form particles of polymeric material; and removing the porogen from the particles to form a macroporous cation exchange resin.

2. The method of claim 1, wherein the macroporous cation exchange resin has pores having a diameter less than or equal to 200 nanometers.

3. The method of claim 2, wherein the macroporous cation exchange resin has a pore volume of at least 0.1 cubic centimeters per gram and a surface area of at least 20 m²/g.

4. The method of claim 1, wherein the crossliniking monomer is present in an amount of 25 to 75 weight percent based on a total weight of monomers in the monomer mixture and the negatively charged ionic monomer is present in an amount of 25 to 75 weight percent based on the total weight of monomers in the monomer mixture.

5. The method of claim 1, wherein the negatively charged ionic monomer is of Formula II or salts thereof

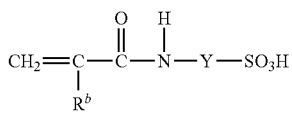

II wherein

Y is a straight or branched alkylene having 1 to 10 carbon atoms; and $R^b$ is hydrogen or methyl.

6. The method of claim 1, wherein $R^2$ is ethylene or propylene.

7. The method of claim 1, wherein $R^1$ is hydroxy and $R^3$ is hydrogen or $R^1$ is hydroxy and $R^3$ is alkyl.

8. The method of claim 1, wherein the porogen comprises a polyethylene oxide with a molecular weight no greater than 1,000 g/mole.

9. The method of claim 8, wherein the polyethylene oxide has hydroxy end groups.

10. The method of claim 1, wherein the porogen comprises a mixture of a first porogen comprising an alkylene glycol and a second porogen comprising a polyalkylene oxide.

11. The method of claim 10, wherein the first porogen comprises ethylene glycol and the second porogen comprises polyethylene oxide with hydroxy end groups.

12. The method of claim 1, wherein the mono-alcohol is present in an amount of at least 50 percent based on the total weight of the aqueous phase solvent mixture.

* * * * *

UNITED STATES PATENT AND TRADEMARK OFFICE
CERTIFICATE OF CORRECTION

| | | |
|---|---|---|
| PATENT NO. | : 7,683,100 B2 | Page 1 of 1 |
| APPLICATION NO. | : 11/313529 | |
| DATED | : March 23, 2010 | |
| INVENTOR(S) | : Jerald Kenneth Rasmussen | |

It is certified that error appears in the above-identified patent and that said Letters Patent is hereby corrected as shown below:

Title Page, Column 2 item (56): (Other Publications)
Line 2, delete "Vinyldimethlazlactone" and insert -- Vinyldimethylazlactone --, therefor.

Line 3, delete "Methylenebisacr'ylamide', Makrornol." and insert
-- Methylenebisacrylamide', Makromol. --, therefor.

Line 4, delete "(i992)" and insert -- (1992) --, therefor.

Column 9
Line 18, delete "vinylalkylaziactones" and insert -- vinylalkylazlactones --, therefor.

Column 23
Line 13 (Approx.), delete "Tex.)" and insert -- TX) --, therefor.

Column 26
Line 11, after "polymeric" delete "10".

Column 27
Line 38, after "solution" insert -- in --.

Column 31
Line 11, in Claim 3, delete "0.1" and insert -- 0.10 --, therefor.

Line 13, in Claim 4, delete "crossliniking" and insert -- crosslinking --, therefor.

Signed and Sealed this
Twentieth Day of September, 2011

David J. Kappos
*Director of the United States Patent and Trademark Office*